US012129689B2

(12) United States Patent
Okawa et al.

(10) Patent No.: US 12,129,689 B2
(45) Date of Patent: Oct. 29, 2024

(54) DOOR LATCH DEVICE

(71) Applicant: MITSUI KINZOKU ACT CORPORATION, Kanagawa (JP)

(72) Inventors: Shintaro Okawa, Kanagawa (JP); Yasuyuki Watanabe, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 351 days.

(21) Appl. No.: 17/630,475

(22) PCT Filed: Oct. 25, 2019

(86) PCT No.: PCT/JP2019/041979
§ 371 (c)(1),
(2) Date: Jan. 26, 2022

(87) PCT Pub. No.: WO2021/019797
PCT Pub. Date: Feb. 4, 2021

(65) Prior Publication Data

US 2022/0251885 A1 Aug. 11, 2022

(30) Foreign Application Priority Data

Jul. 31, 2019 (JP) ................................ 2019-141667

(51) Int. Cl.
*E05B 83/10* (2014.01)
*E05B 81/06* (2014.01)
(Continued)

(52) U.S. Cl.
CPC .............. *E05B 81/06* (2013.01); *E05B 81/16* (2013.01); *E05B 81/54* (2013.01); *E05B 77/34* (2013.01); *E05B 85/02* (2013.01); *E05B 85/24* (2013.01)

(58) Field of Classification Search
CPC .......... E05B 77/34; E05B 79/04; E05B 85/02; E05B 81/06; E05B 81/16; E05B 81/42; E05B 81/54; B60J 5/04
See application file for complete search history.

(56) References Cited

U.S. PATENT DOCUMENTS

2003/0137202 A1* 7/2003 Mao .................... H02K 11/215
310/68 B
2011/0211311 A1* 9/2011 Shinoda .............. H05K 5/0213
361/694
(Continued)

FOREIGN PATENT DOCUMENTS

CN 103841783 A * 6/2014 ............ E05B 77/34
CN 208691641 U 4/2019
(Continued)

OTHER PUBLICATIONS

International Search Report issued in corresponding International Patent Application No. PCT/JP2019/041979, dated, Dec. 24, 2019 with English translation.

*Primary Examiner* — Christine M Mills
*Assistant Examiner* — Christopher F Callahan
(74) *Attorney, Agent, or Firm* — Rimon P.C.

(57) ABSTRACT

A door latch device includes: an electric component including a motor; a machine mechanism; a circuit board; a case; a first cover forming a first housing space in which the motor and the machine mechanism are housed; a second cover forming a second housing space in which the circuit board is housed; a pin hole disposed in the case to establish communication between the first housing space and the second housing space; a pin erected from the circuit board to project to the first housing space through the pin hole; a pin holder configured to support the pin with respect to the circuit board by covering a periphery of a base of the pin; an external waterproof seal configured to waterproof the second
(Continued)

housing space against outside; and an internal waterproof seal configured to waterproof a space between the first housing space and the second housing space.

9 Claims, 14 Drawing Sheets

(51) Int. Cl.

| | |
|---|---|
| ***E05B 81/16*** | (2014.01) |
| ***E05B 81/54*** | (2014.01) |
| *E05B 77/34* | (2014.01) |
| *E05B 85/02* | (2014.01) |
| *E05B 85/24* | (2014.01) |

(56) References Cited

U.S. PATENT DOCUMENTS

| | | | | |
|---|---|---|---|---|
| 2013/0154402 | A1 | 6/2013 | Basavarajappa et al. | |
| 2014/0175813 | A1 | 6/2014 | Margheritti et al. | |
| 2015/0021934 | A1 | 1/2015 | Barmscheidt et al. | |
| 2015/0361694 | A1* | 12/2015 | Zeabari | E05B 81/54 361/752 |
| 2016/0042889 | A1* | 2/2016 | Satou | H01H 13/14 200/293 |
| 2016/0230426 | A1 | 8/2016 | Taurasi et al. | |
| 2016/0273246 | A1 | 9/2016 | Margheritti et al. | |
| 2020/0165843 | A1* | 5/2020 | Michetti | E05B 77/34 |

FOREIGN PATENT DOCUMENTS

| | | | | | |
|---|---|---|---|---|---|
| GB | 2528747 | A | | 2/2016 | |
| JP | 2012-110078 | A | | 6/2012 | |
| JP | 2015-224457 | A | | 12/2015 | |
| JP | 6213927 | B2 | | 10/2017 | |
| JP | 2017-197912 | A | | 11/2017 | |
| JP | 6482537 | B2 | | 3/2019 | |
| WO | WO-2011147593 | A1 | * | 12/2011 | B60K 15/05 |
| WO | WO-2015044323 | A1 | * | 4/2015 | E05B 77/34 |

* cited by examiner

DOOR LATCH DEVICE

CROSS-REFERENCE TO RELATED APPLICATIONS

This application is the U.S. National Phase under 35 U.S.C. § 371 of International Application No. PCT/JP2019/041979, filed on Oct. 25, 2019, which claims the benefit of Japanese Application No. 2019-141667, filed on Jul. 31, 2019, the entire contents of each are hereby incorporated by reference.

FIELD

The present invention relates to a door latch device for closing and opening a vehicle door.

BACKGROUND

A door latch device of a vehicle includes a latch mechanism that latches and unlatches a striker disposed on a main body side of the vehicle, and closes and opens a door by the latch mechanism.

Patent Literature 1 discloses a door latch device including an electric release mechanism that can release engagement between a latch mechanism and a striker by power of a motor, a manual release mechanism that can release engagement of the latch mechanism by manual operation force, and a lock mechanism that can switch between a locked state that disables a release function of the manual release mechanism and an unlocked state that enables the same.

In this door latch device, engagement of the latch mechanism is released exclusively by the electric release mechanism, and the manual release mechanism is disposed as a complement for a case in which the function of the electric release mechanism is disabled due to an accident, a fault in an electrical system, a voltage drop of a battery, and the like. Thus, the lock mechanism is used only for the function of the manual release mechanism, and is always used in the locked state and switched to the unlocked state for a predetermined situation.

In this door latch device, the locked state and the unlocked state of the lock mechanism are switched by normal rotation and reverse rotation of a cam wheel rotated by power of the motor. The cam wheel is held at a reference position by energizing force of a neutral return spring, and has a configuration for switching the lock mechanism to the locked state when normally rotated from the reference position, and switching the lock mechanism to the unlocked state when reversely rotated from the reference position.

Additionally, the cam wheel also releases engagement of the latch mechanism when normally rotated from the reference position. Due to this, the lock mechanism can be switched, and the engagement of the latch mechanism can be released by a single motor.

On the other hand, some door latch devices for closing and opening the vehicle door include electric components such as a motor and a position switch. The motor is used, for example, for an automatic lock function, a transition from a half latch state to a full latch state, and the like depending on specifications. The motor is controlled by a predetermined circuit board based on the position switch or another signal.

The door latch device including the electric components has a dripproof structure, for example. On the other hand, the circuit board requires a higher waterproof property than that of the electric components such as the motor, so that the circuit board is often housed in a waterproof ECU that is disposed separately from the door latch device.

However, when the waterproof ECU is disposed separately from the door latch device, the number of components is increased corresponding thereto, and the number of steps for mounting the components on the vehicle is increased accordingly. Additionally, a harness between the door latch device and the waterproof ECU, and a connecting step therefor are required.

Thus, in Patent Literature 2, the circuit board that controls the motor is disposed inside the door latch device. In this door latch device, a space in which the circuit board is housed and a space in which a mechanism part is housed are partitioned with a partition wall. The space in which the circuit board is disposed is covered by a predetermined cover, and waterproofed with a first seal with respect to an external space. A pin is erected from the circuit board, and projects to the space of the mechanism part through a hole disposed on the partition wall. A second seal having a ring shape is disposed between the hole of the partition wall and the circuit board, and the second seal abuts on the periphery of the pin on a surface of the circuit board to achieve waterproofing.

CITATION LIST

Patent Literature

Patent Literature 1: Japanese Patent No. 6213927
Patent Literature 2: Japanese Patent No. 6482537

SUMMARY

Technical Problem

In the door latch device disclosed in Patent Literature 1 of what is called a knob-less type not including a locking/unlocking knob for manually switching the lock mechanism, manual switching to an unlocked state using a key and switching to the unlocked state by power of the motor are not required to be used unless a predetermined situation is caused. Thus, the lock mechanism does not work by a normal operation, and is maintained in the locked state for a long time. As a result, there is the concern that grease is hardened due to long-term deterioration, or a spring, a lever, and the like made of steel material rust, and the lock mechanism does not smoothly function in a predetermined situation. Thus, there is a demand for a door latch device in which the lock mechanism smoothly functions in a predetermined situation.

In the door latch device disclosed in Patent Literature 1, the lock mechanism is switched from the unlocked state to the locked state on the condition that engagement of the latch mechanism is released, so that the lock mechanism cannot be singly switched from the unlocked state to the locked state without releasing engagement of the latch mechanism by a single motor. Thus, there is a demand for a door latch device that can release engagement of the latch mechanism and switch the lock mechanism to the locked state and the unlocked state by a single motor. At this point, it is preferable that unnecessary sound that bothers a user is not generated.

On the other hand, in the door latch device disclosed in Patent Literature 2, force is applied to the pin disposed on the circuit board due to connection with the motor and the like, so that the pin requires fixing strength with respect to the circuit board, is an irregular type including a plurality of solder legs, and requires a wide area corresponding thereto. A range surrounded by the second seal is not waterproofed on the surface of the circuit board, so that a soldered portion of a base of the pin is also not waterproofed, and there is concern about durability. Furthermore, a through hole or a pattern cannot be disposed in this non-waterproofed range. In this way, with the door latch device disclosed in Patent Literature 2, a sufficient waterproof property cannot be obtained, so that there is a constraint on arrangement of components and the like.

The present invention is made in view of the problem described above, and provides a door latch device that can waterproof the entire surface of a circuit board.

Solution to Problem

In order to solve the above-described problem and achieve the object, a door latch device according to the present invention is disposed on a door of a vehicle, the door latch device being configured to latch and unlatch a striker disposed on a main body side of the vehicle to close and open the door, and the door latch device including: an electric component including a motor; a machine mechanism configured to be driven by the motor; a circuit board electrically connected to the electric component; a case; a first cover forming a first housing space in which the motor and the machine mechanism are housed by covering one surface of the case; a second cover forming a second housing space in which the circuit board is housed by covering another surface of the case; a pin hole disposed in the case to establish communication between the first housing space and the second housing space; a pin erected from the circuit board to project to the first housing space through the pin hole; a pin holder configured to support the pin with respect to the circuit board by covering a periphery of a base of the pin; an external waterproof seal disposed between the case and the second cover, and configured to waterproof the second housing space against outside; and an internal waterproof seal disposed between the pin holder and the pin hole, and configured to waterproof a space between the first housing space and the second housing space.

A plurality of internal waterproof structures each including the pin, the pin holder, the pin hole, and the internal waterproof seal may be disposed.

The second cover may include a support projection configured to support a back side of an abutting part of the pin holder on the circuit board.

The pin holder may include a leg part at a position opposed to the support projection across the circuit board.

A pair of the leg parts may be disposed on both sides across an inserting part of the pin in a longitudinal direction of the pin holder.

The support projection and the leg part may be disposed to be overlapped with each other on the circuit board in a plan view.

The pin holder may include a positioning projection inserted into a positioning hole disposed on the circuit board to perform positioning.

A part of the internal waterproof seal may project to a first housing space from the pin hole to abut on the electric component.

The case may include: a recessed part forming part of the second housing space; a surrounding wall configured to surround the recessed part; and a seal groove formed along an outer circumference of the surrounding wall, the second housing space may be formed by covering the recessed part by the second cover, and the external waterproof seal may be disposed in the seal groove.

The circuit board may be sandwiched by a first circuit board supporter disposed in the case and a second circuit board supporter disposed on the second cover.

The machine mechanism may include: a latch mechanism configured to hold the door in a closed state; an electric release unit configured to release the latch mechanism by power of the motor; a manual release unit configured to release the latch mechanism by manual operation force; and a lock mechanism configured to switch between a locked state for disabling a function of the manual release unit and an unlocked state for enabling the function of the manual release unit, the electric release unit may include a cam wheel configured to normally rotate and reversely rotate from a reference position by power of the motor, the lock mechanism may be held in the locked state at the time when the cam wheel is at the reference position, the latch mechanism may be released when the cam wheel normally rotates against spring force from the reference position, the lock mechanism may be caused to be in the unlocked state, and the lock mechanism may be switched to the locked state when the cam wheel returns to the reference position by spring force, and the lock mechanism may be returned to the locked state when the cam wheel reversely rotates from the reference position and normally rotates to return to the reference position.

The lock mechanism may include: a position switching member configured to be switched between an unlocked position at which a door-opening operation by the manual release unit is able to be transmitted to the latch mechanism and a locked position at which the door-opening operation is unable to be transmitted; and a lock lever configured to interlock with the manual release unit or the electric release unit to be able to switch the position switching member between the unlocked position and the locked position, and, when the cam wheel normally rotates against spring force from the reference position, the position switching member may be switched to the unlocked position from the locked position, and the lock lever does not operate.

Advantageous Effects of Invention

With the door latch device according to the present invention, the entire surface of the circuit board can be waterproofed with the external waterproof seal and the internal waterproof seal.

DESCRIPTION OF EMBODIMENTS

Figure 1:
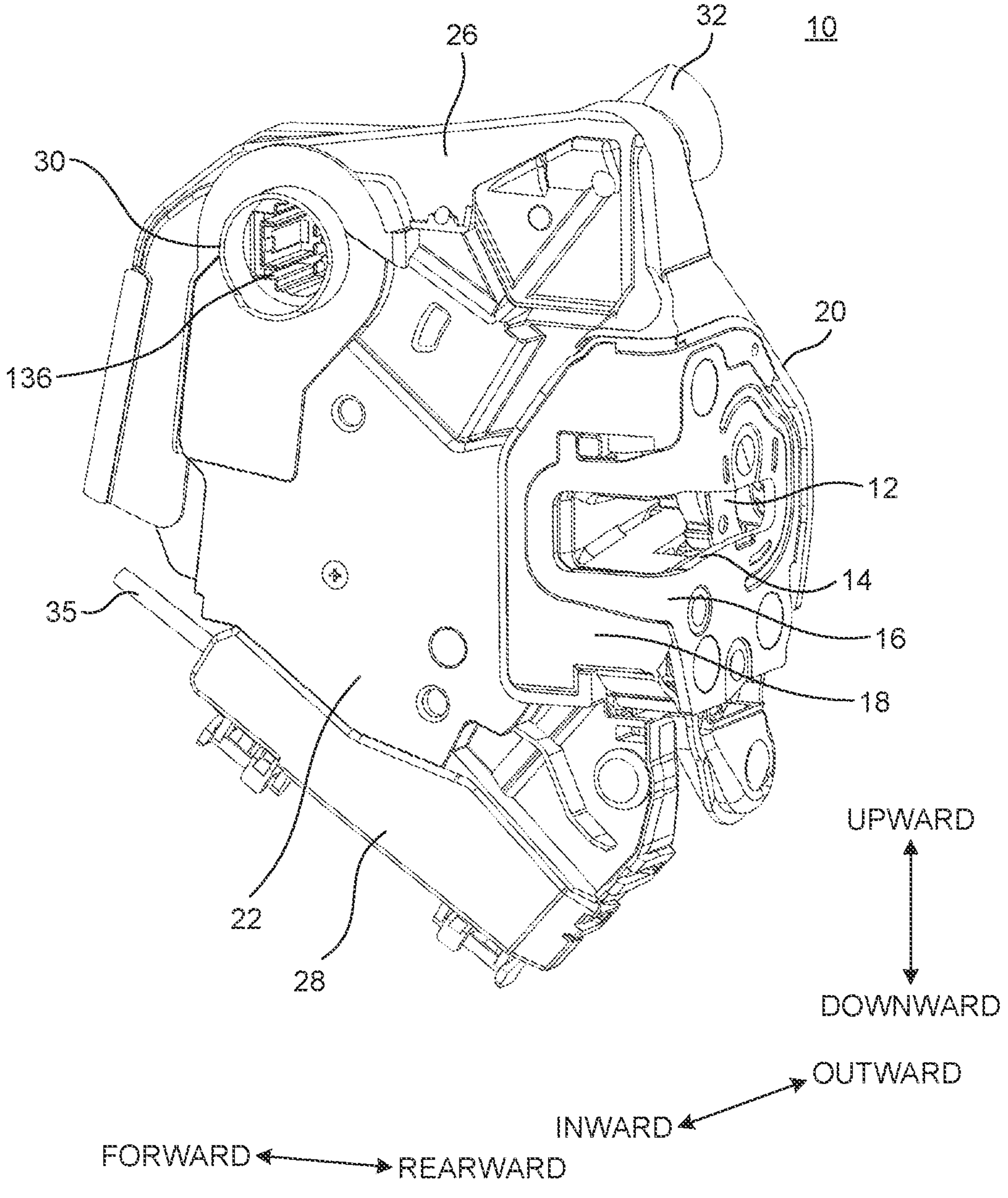
FIG. 1 is a perspective view of a door latch device according to an embodiment viewed from obliquely rearward on the outside of a vehicle.

The following describes an embodiment of a door latch device according to the present invention in detail based on the drawings. The present invention is not limited to the embodiment.

In the following description, representation of directions in the description of a door latch device 10 is based on the vehicle. As the directions based on the vehicle, upward and downward, inward and outward (that is, an indoor side and an outdoor side), and forward and rearward are indicated by arrows when appropriate in the drawings. Representation of a rotation direction (a clockwise direction, a counterclockwise direction) of a rotary component basically corresponds to the drawing that is referred to at the present point. The door latch device 10 exemplified in each of the drawings is a door latch device applied to a right side door of the vehicle, but a door latch device applied to a left side door may have a symmetrical structure.

Figure 2:
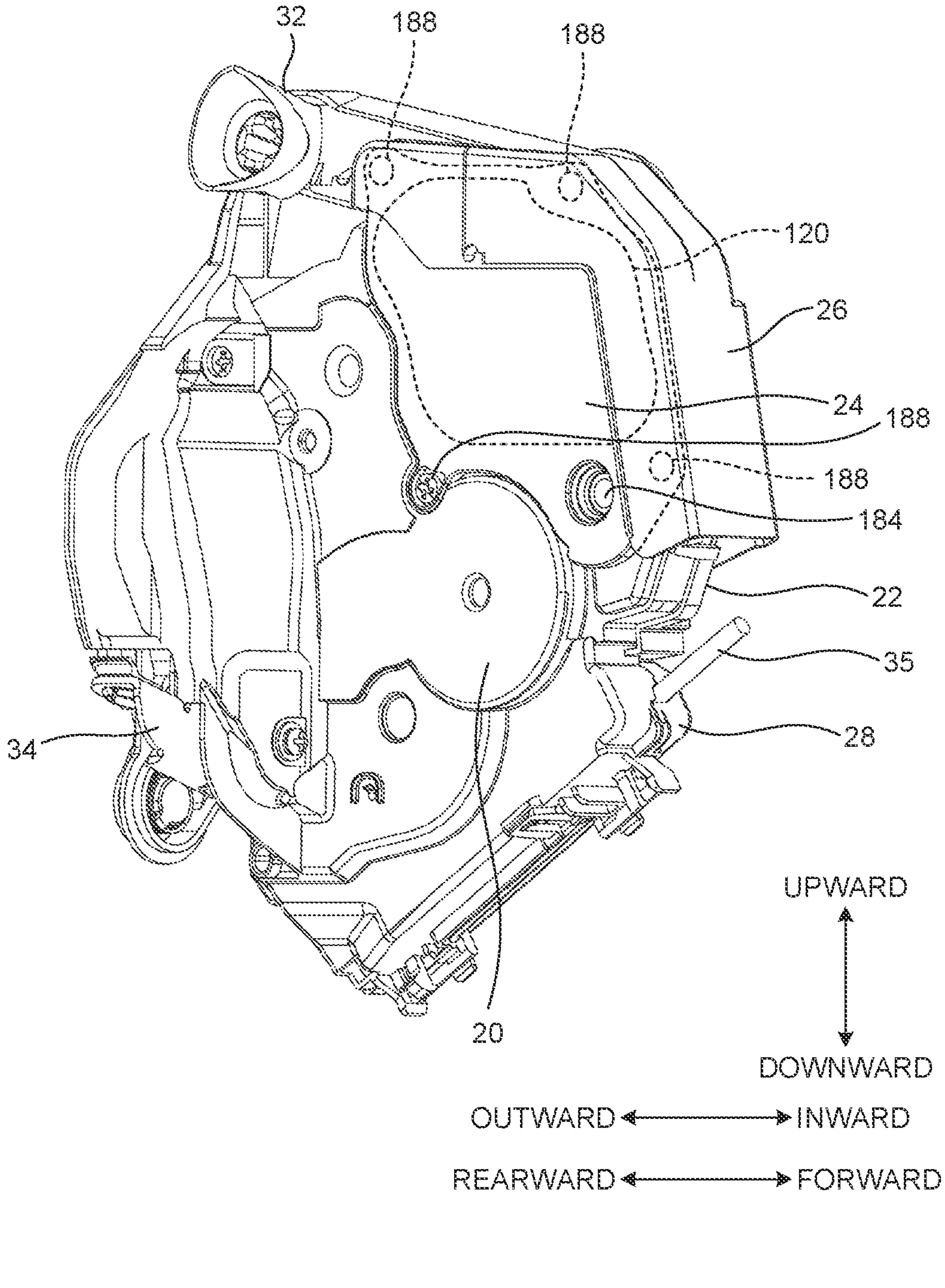
FIG. 2 is a perspective view of the door latch device viewed from obliquely forward on the outside of the vehicle.

FIG. 1 is a perspective view of the door latch device 10 according to the present embodiment viewed from obliquely rearward, and FIG. 2 is a perspective view of the door latch device 10 viewed from obliquely forward on the outside of the vehicle.

The door latch device 10 is attached to an inner part of the door of the vehicle, and closes and opens the door by latching and unlatching a striker disposed on a main body side of the vehicle. For example, the door latch device 10 is disposed to latch the striker on a side door of the vehicle, but the "door" has a broad sense, and may be applied to a hood, a trunk lid, a tail gate, and the like. First, the following describes a schematic entire configuration of the door latch device 10.

As illustrated in FIG. 1 and FIG. 2, in the door latch device 10, a latch 12 that latches the striker is disposed at the back of a striker entry groove 14. The latch 12 is part of a latch mechanism 44 described later. The striker entry groove 14 is formed as part of a cover plate 16. A body 18 is disposed around the cover plate 16. An inner side and a rear side of the latch mechanism 44 are covered by the cover plate 16 and the body 18.

The door latch device 10 is covered by a case 20, a first cover 22, and a second cover 24 in addition to the cover plate 16 and the body 18 described above. The case 20 mainly covers an outer side, the first cover 22 mainly covers an inner side, and the second cover 24 further covers a forward upper part of the inner side of the case 20. The cover plate 16, the body 18, the case 20, the first cover 22, and the second cover 24 form a housing of the door latch device 10.

The door latch device 10 further includes a waterproof cover 26 that covers an upper surface, a cable cover 28 on an inner lower side, a coupler 30 disposed on an inner upper part, and a key cylinder coupling part 32 disposed on an outer upper part. The waterproof cover 26 covers a boundary part between the case 20 and the first cover 22, and the second cover 24 from above to prevent entry of waterdrops. The cable cover 28 covers a connecting portion for a cable 35. The cable 35 is connected to an inner handle (not illustrated). A harness connector (not illustrated) is connected to the coupler 30. A sponge may be disposed around the coupler 30. The key cylinder coupling part 32 is a portion into which a key is inserted to be operated. An end part of an outer lever 34 connected to an outer handle (not illustrated) is exposed to an outer surface of the door latch device 10.

Figure 3:
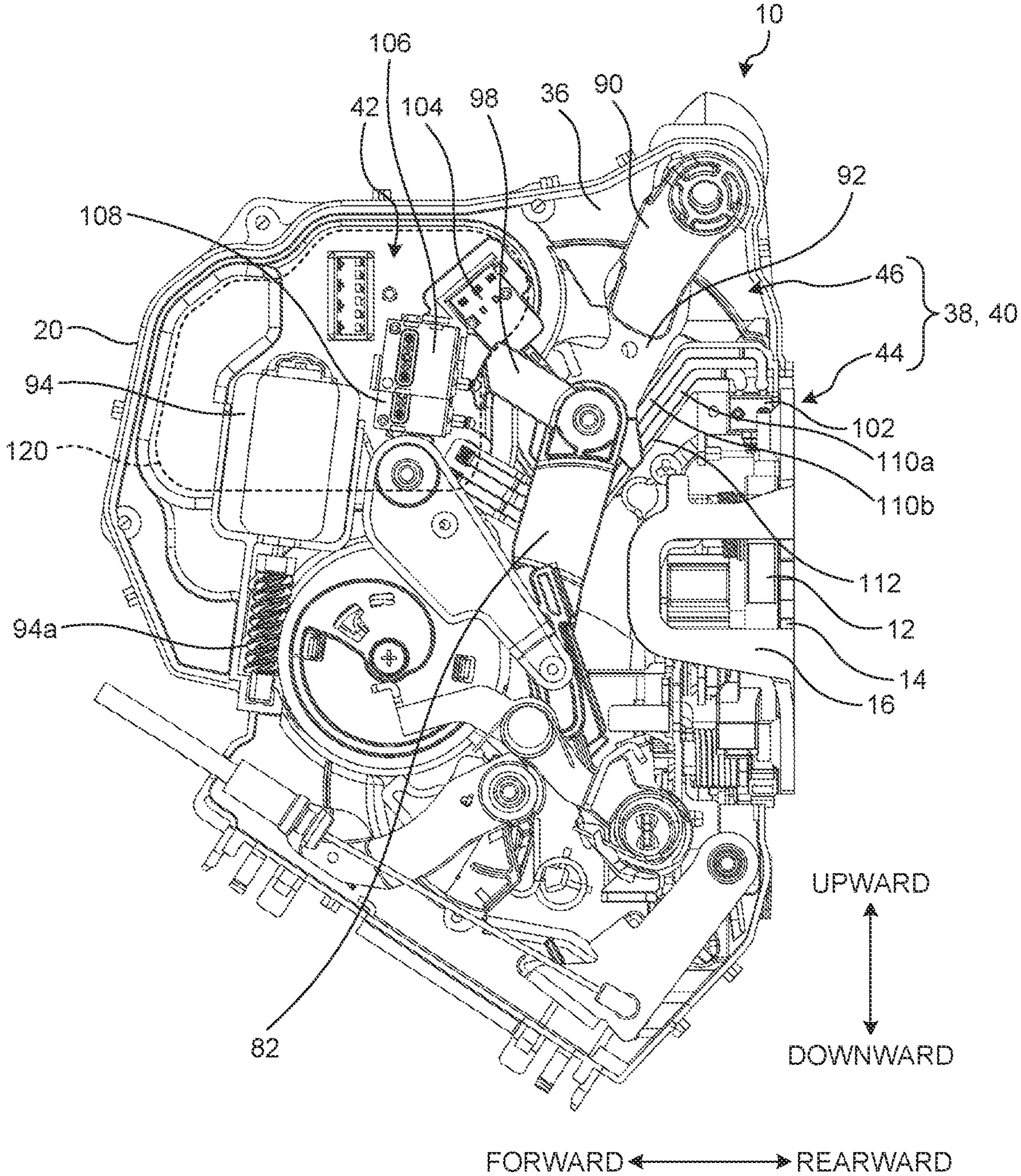
FIG. 3 is a side view illustrating an inner part of the door latch device.

FIG. 3 is a side view illustrating an inner part of the door latch device 10. FIG. 3 illustrates the door latch device 10 in a state in which the body 18, the first cover 22, the waterproof cover 26, and the cable cover 28 are removed.

As illustrated in FIG. 3, a first housing space 36 is formed inside the door latch device 10. The first housing space 36 is a region the outer side of which is covered by the case 20, and the inner side thereof is mainly covered by the first cover 22. The inner side of the first housing space 36 is covered by the cover plate 16, the body 18, and the cable cover 28 in addition to the first cover 22.

The first housing space 36 can be briefly partitioned into a mechanism region 40 in which a machine mechanism 38 is disposed, and an electric component region 42 in which electric components are disposed. The electric component region 42 occupies a forward upper part, and the mechanism region 40 occupies a remaining portion. The machine mechanism 38 includes a latch mechanism 44 that latches and unlatches the striker with the latch 12, and a lock mechanism 46 that causes the latch mechanism 44 to be in a locked state and an unlocked state. The latch mechanism 44 is disposed rearward in the first housing space 36, and covered by the cover plate 16 and the body 18. In the door latch device 10, a second housing space 124 (refer to FIG. 10) is formed in addition to the first housing space 36. The second housing space 124 will be described later.

The machine mechanism 38 also includes an electric release unit that can release the latch mechanism 44 by power of a motor 94, and a manual release unit that can release the latch mechanism 44 by manual operation force. The electric release unit is a unit that includes the motor 94, a cam wheel 76, and the like (described later), and unlatches the striker. The manual release unit is a unit that unlatches the striker via the outer lever 34 that mechanically interlocks with a manual operation and an inner lever 59 (described later).

Figure 4:
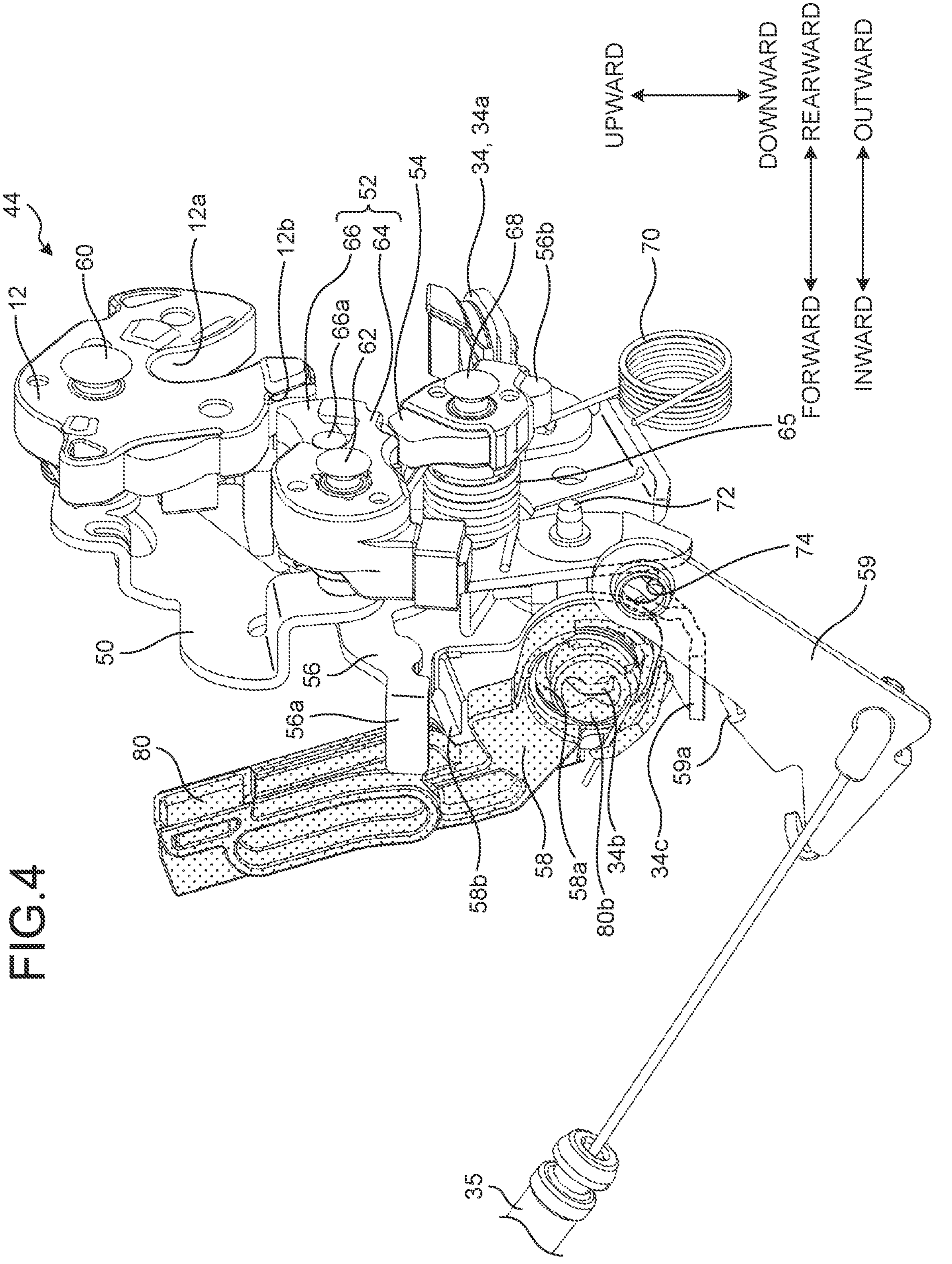
FIG. 4 is a perspective view of a latch mechanism.

FIG. 4 is a perspective view of the latch mechanism 44. As illustrated in FIG. 4, the latch mechanism 44 includes a base bracket 50, a ratchet 52, a ratchet holder 54, a ratchet lever 56, an anti-panic lever 58, and the inner lever 59 in addition to the latch 12 and the outer lever 34 described above. Each element of the latch mechanism 44 is supported or pivotally supported by the base bracket 50.

The latch 12 is pivotally supported by a shaft part 60, and includes a striker engagement groove 12*a* and a ratchet engagement part 12*b*. The latch 12 rotates against a spring (not illustrated) when the striker enters the striker engagement groove 12*a* from a door-opened state, latches the striker at a full-latch position when the ratchet 52 engages with the ratchet engagement part 12*b*, and closes the door.

The ratchet 52 includes a base lever 64 pivotally supported by a shaft part 62, and a pole lever 66 including a base shaft part 66*a* pivotally supported by the base lever 64. The base lever 64 is elastically energized by a spring 65. The pole lever 66 bends within a predetermined angle range with respect to the base lever 64. The ratchet 52 is supported by the ratchet holder 54 from a side to hold a substantially linear attitude of the ratchet 52, and a distal end of the pole lever 66 engages with the ratchet engagement part 12*b* to hold the latch 12 at the full-latch position.

The ratchet holder 54 is pivotally supported by a shaft part 68, and elastically energized by a spring 70 to laterally support the base lever 64. The ratchet holder 54 rotates against elastic force of the spring 70 based on an operation of the ratchet lever 56, and is separated from the base lever 64. The base lever 64 and the pole lever 66 of the ratchet 52 are then caused to be in a buckling state with respect to the base shaft part 66*a*, and the pole lever 66 is detached from the ratchet engagement part 12*b* to open the latch 12. The latch 12 rotates by elastic force to unlatch the striker, and opens the door. By operating the ratchet 52 via the ratchet holder 54, the operation is enabled to be performed by lighter force as compared with a case of directly operating the ratchet 52.

The ratchet lever 56 is pivotally supported by the base bracket 50, and includes a passive part 56*a* projecting inward from a rotor shaft, and an action part 56*b* projecting outward from the rotor shaft. In the ratchet lever 56, the action part 56*b* rotates the ratchet holder 54 when the passive part 56*a* moves upward.

The outer lever 34 is pivotally supported by a shaft part 72, and includes a handle operating part 34*a* projecting outward from the shaft part 72, and an action part 34*b* and a lever passive piece 34*c* projecting inward from the shaft part 72. The handle operating part 34*a* is a portion operated by the outer handle. The action part 34*b* is inserted into a hole 58*a* of the anti-panic lever 58, and acts on the anti-panic lever 58. The action part 34*b* is also inserted into a deformed hole 80*b* of an open link 80 (described later). The lever passive piece 34*c* is disposed below the action part 34*b*, and operated by the inner lever 59. The outer lever 34 is rotated by an operation of the handle operating part 34*a* or the lever passive piece 34*c*, and pushes up the anti-panic lever 58.

The inner lever 59 is pivotally supported by a shaft part 74, and is swung when the cable 35 is operated, whereby an operation piece 59*a* pushes up the lever passive piece 34*c*.

The anti-panic lever 58 includes the hole 58*a* into which the action part 34*b* is inserted, and an action piece 58*b* bent at an upper part. The anti-panic lever 58 is pushed up by the action part 34*b* due to rotation of the outer lever 34 when the open link 80 (described later) is at an unlocked position, and the action piece 58*b* pushes up the passive part 56*a* of the ratchet lever 56. Due to this, the ratchet holder 54 and the ratchet 52 perform an unlatch operation. The anti-panic lever 58 has a structure separated from the open link 80 for an anti-panic mechanism.

Figure 5:
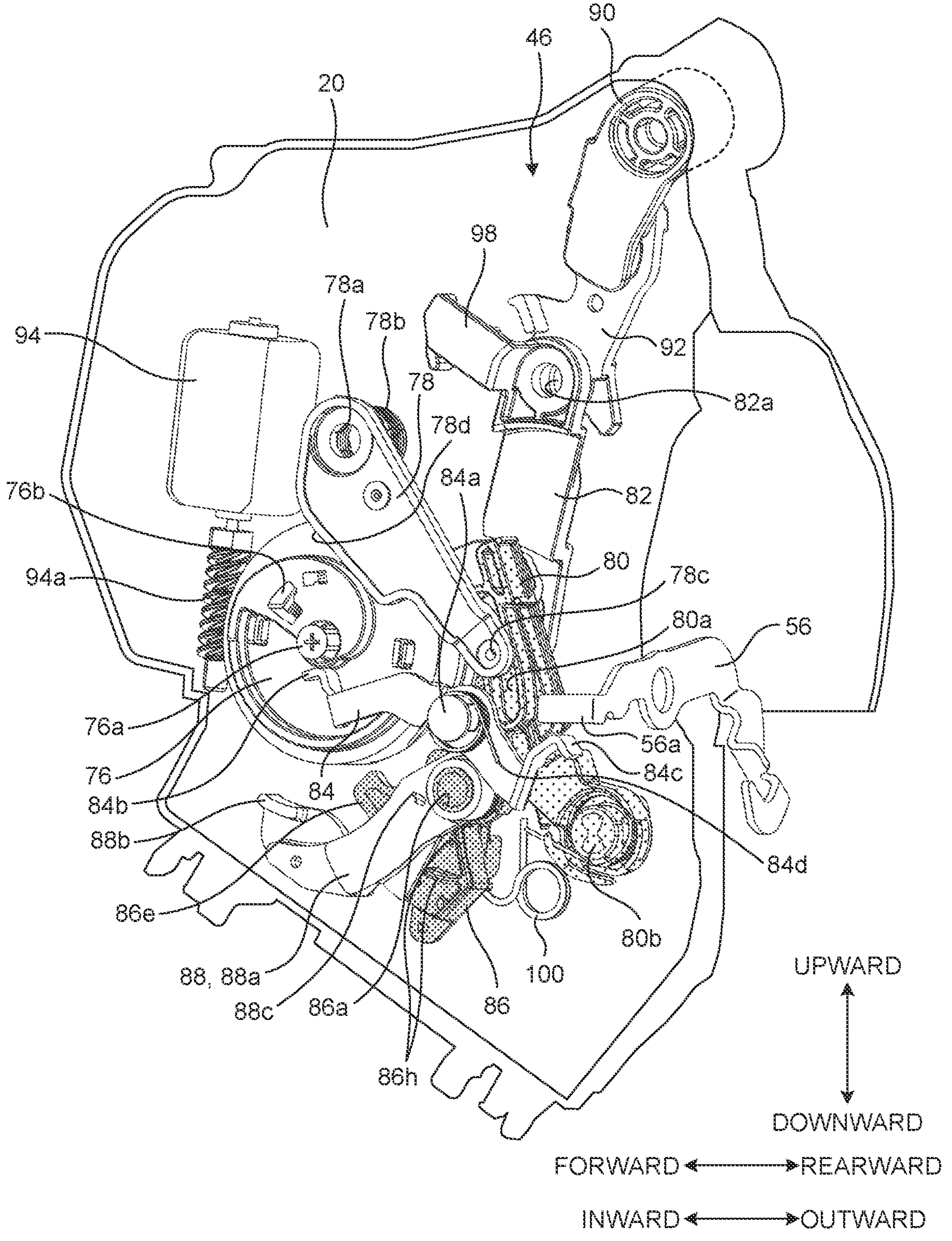
FIG. 5 is a perspective view of the lock mechanism viewed from obliquely inside rearward.
Figure 6:
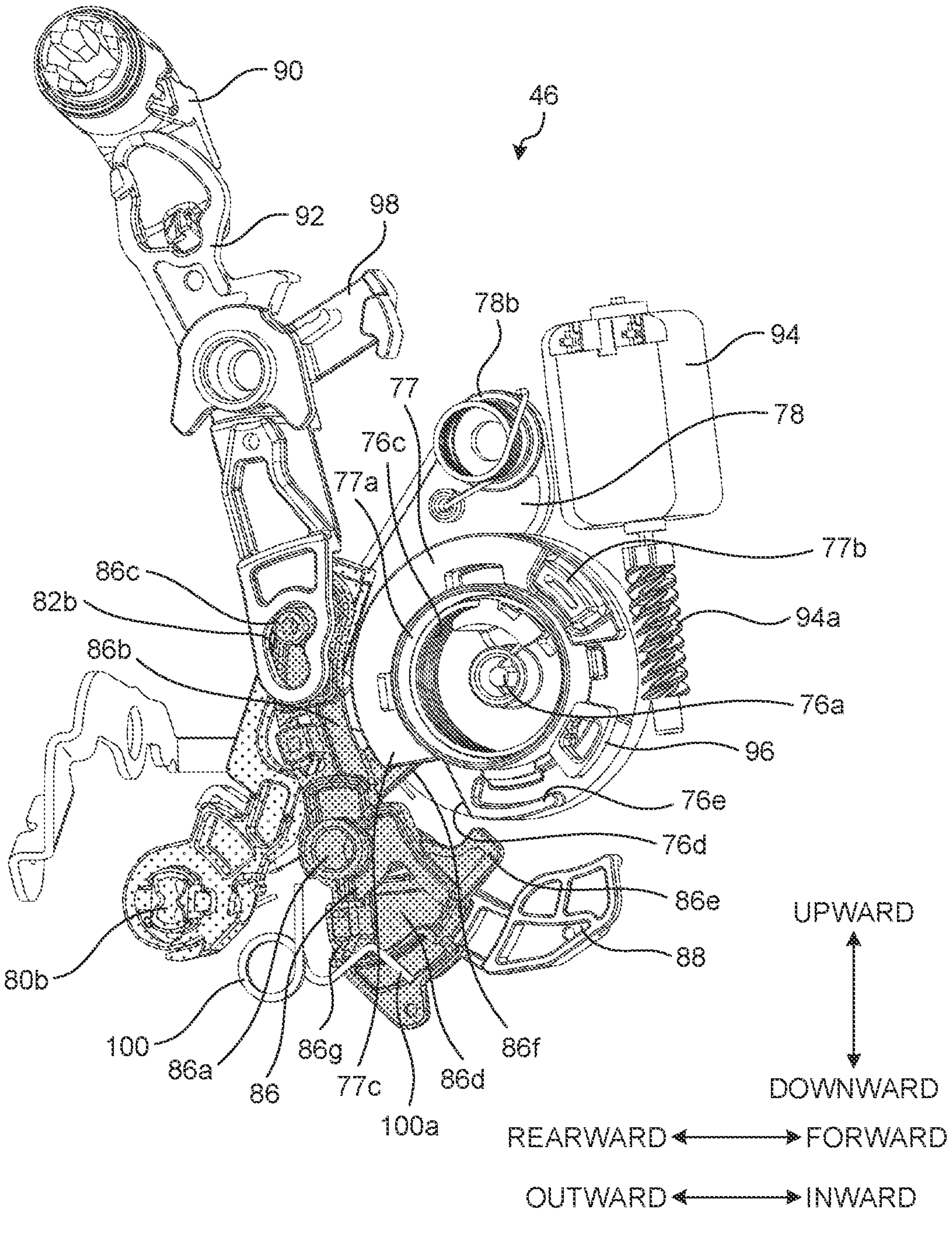
FIG. 6 is a perspective view of the lock mechanism viewed from obliquely outside forward.

FIG. 5 is a perspective view of the lock mechanism 46 viewed from obliquely inside rearward, and FIG. 6 is a perspective view of the lock mechanism 46 viewed from obliquely outside forward. In FIG. 5, the case 20 is also briefly illustrated so that arrangement of the lock mechanism 46 can be understood. In FIG. 5 and FIG. 6, the lock mechanism 46 is in the locked state.

As illustrated in FIG. 5 and FIG. 6, the lock mechanism 46 includes a cam wheel 76 pivotally supported by a shaft part 76*a*, a cam lever 78 that is pivotally supported by a shaft part 78*a* and driven by the cam wheel 76, the open link (position switching member) 80 driven by the cam lever 78, a sub-lock lever 82 interlocking with the open link 80, and an open lever 84 that is pivotally supported by a shaft part 84*a* and driven by the cam wheel 76. The lock mechanism 46 further includes a lock lever 86 and an auxiliary lever 88 interlocking with the sub-lock lever 82, and a key lever 90 and a sub-key lever 92 that interlock with a key operation to drive the sub-lock lever 82. For facilitating identification of components in each drawing, the lock lever 86 is represented by a dark dot pattern, and the open link 80 is represented by a light dot pattern.

The cam wheel 76 has a disk shape, and rotates when teeth disposed on an outer peripheral surface are driven by a worm 94*a* of a rotor shaft of the motor 94. The teeth are not illustrated. The motor 94 is disposed in the electric component region 42 (refer to FIG. 3). A rotation direction of the cam wheel 76 is represented such that a clockwise direction indicates normal rotation, and a counterclockwise direction indicates reverse rotation based on FIG. 5.

The cam wheel 76 includes a cam 76*b*. The cam 76*b* has a shape having a diameter that gradually increases, from immediately below the shaft part 76*a* in the counterclockwise direction across about 270°, when the cam wheel 76 is at a reference position. The diameter thereof is close to a radius of the cam wheel 76 at a position of about 270°, and the diameter is maintained in the counterclockwise direction to a position of about 180°.

As illustrated in FIG. 6, an auxiliary component 77 is disposed on an inner surface of the cam wheel 76. The cam wheel 76 and the auxiliary component 77 are fixed to be substantially one component. A spring 76*c* is disposed inside a sleeve 77*a* formed of the auxiliary component 77. The spring 76*c* energizes the cam wheel 76 to be at a neutral reference position. The cam wheel 76 can normally rotate and reversely rotate against the spring 76*c* from the reference position due to action of the motor 94.

The auxiliary component 77 includes a projection 77*b* projecting inward from an outer circumference vicinity part, and a first inclined wall 77*c* disposed on substantially the opposite side of the projection 77*b*. The projection 77*b* abuts on an elastic stopper 96 disposed in the case 20 (refer to FIG. 2) when the cam wheel 76 reversely rotates, and restricts rotation of the cam wheel 76. The first inclined wall 77*c* is formed such that the width thereof is increased in the counterclockwise direction from a sleeve surface of the sleeve 77*a* in a radial direction.

The cam wheel 76 further includes a second inclined wall 76*d* and a holding wall 76*e*. The second inclined wall 76*d* is formed such that the width thereof is increased in the clockwise direction from the sleeve surface of the sleeve 77*a* in the radial direction. The first inclined wall 77*c* and the second inclined wall 76*d* are formed to be opposed to each other at close positions, and are inclined in reverse directions. The first inclined wall 77*c* is disposed on an outer side as compared with the second inclined wall 76*d*. The holding wall 76*e* is a wall having a circular arc shape that is disposed on a side slightly closer to the counterclockwise direction than the second inclined wall 76*d*, and projects outward along a peripheral surface of the cam wheel 76. As illustrated in FIG. 6, a clockwise direction side of the holding wall 76*e* is closed, and a counterclockwise direction side thereof is opened.

Returning to FIG. 5, a lower surface 78*d* of the cam lever 78 abuts on the cam 76*b*, and when the cam wheel 76 rotates, the cam lever 78 is driven by the cam 76*b* to swing against a spring 78*b* in the counterclockwise direction. A knob 78*c* at a distal end of the cam lever 78 is fitted into a side surface guide groove 80*a* of the open link 80, and erects the inclined open link 80 when the cam lever 78 swings in the clockwise direction.

The deformed hole 80*b* is formed at a lower end of the open link 80. The action part 34*b* of the outer lever 34 (refer to FIG. 4) is inserted into the deformed hole 80*b*, and the open link 80 is lifted up by an operation of the outer lever 34. The anti-panic lever 58 is assembled to a lower end of the open link 80, and moves up and down, and is inclined integrally with the open link 80.

Figure 8:
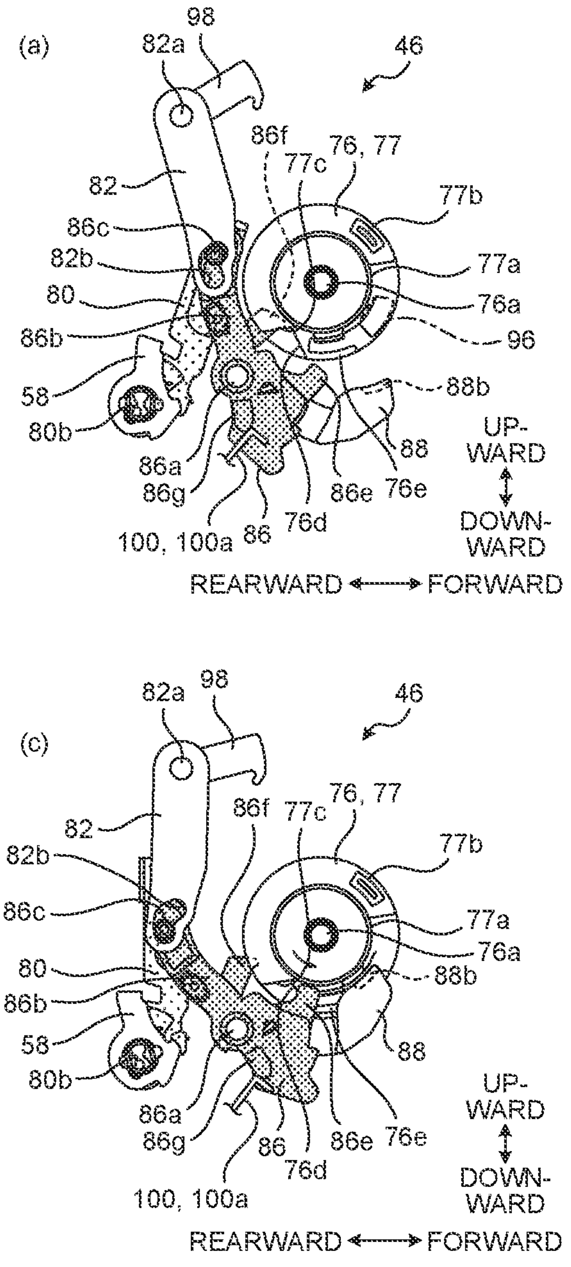
FIG. 8 is a diagram for explaining the operation of the lock mechanism at the time when the cam wheel reversely rotates and normally rotates, (a) is a diagram illustrating a basic state in which the cam wheel is at the reference position, (b) is a diagram illustrating a state in which the cam wheel reversely rotates from the reference position by about 40°, (c) is a diagram illustrating a state in which the cam wheel normally rotates from the state of (b) by about 40°, and (d) is a diagram illustrating a state in which the cam wheel normally rotates from the state of (c) by about 40°.

The open link 80 is a component to be switched to a locked position of an inclined attitude (an attitude in FIG. 5) and an unlocked position of an erected attitude (refer to FIG. 8(*b*)) by the cam lever 78. The lock mechanism 46 is caused to be in a locked state when the open link 80 is at the locked position, and the lock mechanism 46 is caused to be in an unlocked state when the open link 80 is at the unlocked position. A position of the open link 80 is switched by the lock lever 86.

That is, when the open link 80 is at the locked position, the anti-panic lever 58 (refer to FIG. 4) does not abut on the ratchet lever 56 (refer to FIG. 4) even in a case of being lifted up by the outer lever 34 because the anti-panic lever 58 is inclined together with the open link 80, that is, an attempt fails. Thus, the ratchet lever 56 does not operate, and the door is kept being closed as the locked state.

On the other hand, when the open link 80 is at the unlocked position and lifted up by the outer lever 34, the anti-panic lever 58 is erected together with the open link 80, so that the anti-panic lever 58 abuts on and pushes up the ratchet lever 56. Thus, the ratchet lever 56 operates to cause the unlocked state in which the door may be opened.

The sub-lock lever 82 is pivotally supported by a shaft part 82*a* to be able to swing, and is swung and driven by the key lever 90 and the sub-key lever 92 to switch between the locked position and the unlocked position of the open link 80. That is, the sub-lock lever 82 can switch between the locked state and the unlocked state. When the sub-lock lever 82 swings in the counterclockwise direction under action of the key lever 90 and the sub-key lever 92, an upper portion of the open link 80 is pushed out from the sub-lock lever 82 via an inner knob 86*i* (refer to FIG. 7(*d*)) of the lock lever 86, and swings in the clockwise direction to be at the unlocked position. When the sub-lock lever 82 swings in the clockwise direction to return to a previous position, elastic force of the spring 78*b* is transmitted to the open link 80 via the cam lever 78, and the open link 80 swings in the counterclockwise direction to be at the locked position. An arm 98 projecting forward from the shaft part 82*a* is disposed at an upper part of the sub-lock lever 82. The arm 98 is used as a unit for identifying whether the lock mechanism 46 is in the locked state or the unlocked state, and performs switching operation between a first lock position switch 106 and a second lock position switch 108 (refer to FIG. 3) described later.

The open lever 84 is a component used for opening the door based on electric release, that is, a switch operation and the like performed by a driver. The open lever 84 includes a cam passive part 84*b* projecting forward and a ratchet operation part 84*c* projecting rearward, and is energized in the clockwise direction by a spring 84*d*. When the cam wheel 76 normally rotates, the cam 76*b* pushes down the cam passive part 84*b*, the open lever 84 rotates against the spring 84*d* in the counterclockwise direction about the shaft part 84*a*, and the ratchet operation part 84*c* moves upward. When the ratchet operation part 84*c* moves upward, the passive part 56*a* of the ratchet lever 56 is pushed up, and the latch mechanism 44 is unlatched to open the door. When the cam wheel 76 returns to the reference position, the open lever 84 is also returned to a reference attitude by the spring 84*d*.

The open lever 84 can operate the ratchet lever 56 independently of the open link 80. Thus, with the open lever 84, the door can be opened based on the electric release unit even when the lock mechanism 46 is in the locked state (that is, the open link 80 is at the locked position).

As illustrated in FIG. 6, the lock lever 86 is pivotally supported by a shaft part 86*a*, and includes an arm 86*b* extending upward, an outer knob 86*c* projecting outward from a distal end of the arm 86*b*, a first projection 86*e* projecting forward from a downward extending part 86*d*, a second projection 86*f* projecting forward from the vicinity of the shaft part 86*a*, a spring reception part 86*g* projecting outward from the downward extending part 86*d*, and two push-out parts 86*h*. The outer knob 86*c* is fitted into a guide hole 82*b* formed at a lower end of the sub-lock lever 82. When the sub-lock lever 82 swings, the lock lever 86 is swung by the outer knob 86*c*. The lock lever 86 can be displaced to an acting position for switching the open link 80 from the locked position to the unlocked position, and a non-acting position at which switching action is not performed on the open link 80. The lock lever 86 is driven by the cam wheel 76 or the sub-lock lever 82.

The spring reception part 86*g* abuts on a bending part 100*a* of a spring 100. When the sub-lock lever 82 swings, the spring reception part 86*g* gets over the bending part 100*a* while elastically deforming the bending part 100*a* to be disposed at any one of the locked position and the unlocked position. Accordingly, the sub-lock lever 82 may take any one of the locked attitude illustrated in FIG. 6 and the unlocked attitude (refer to FIG. 8(*b*)).

The first projection 86*e* is pushed out by the first inclined wall 77*c*. Due to this, the lock lever 86 rotates in the clockwise direction. The second projection 86*f* is pushed out by the second inclined wall 76*d*. Due to this, the lock lever 86 rotates in the counterclockwise direction. The second projection 86*f* can enter a gap between a side surface of the cam wheel 76 and the first inclined wall 77*c*. The two push-out parts 86*h* supports the auxiliary lever 88 from below.

As illustrated in FIG. 5, the auxiliary lever 88 is pivotally supported by the shaft part 86*a* similarly to the lock lever 86, and includes an arm 88*a* projecting forward and a circular arc projection 88*b* disposed on an upper part of a distal end of the arm 88*a*. The circular arc projection 88*b* has a shape that can engage with the holding wall 76*e* (refer to FIG. 6). The auxiliary lever 88 is energized against the lock lever 86 in the counterclockwise direction by a spring 88*c*, and a lower surface thereof abuts on the push-out part 86*h* to be supported.

Next, the following describes action of the lock mechanism 46.

Figure 7:
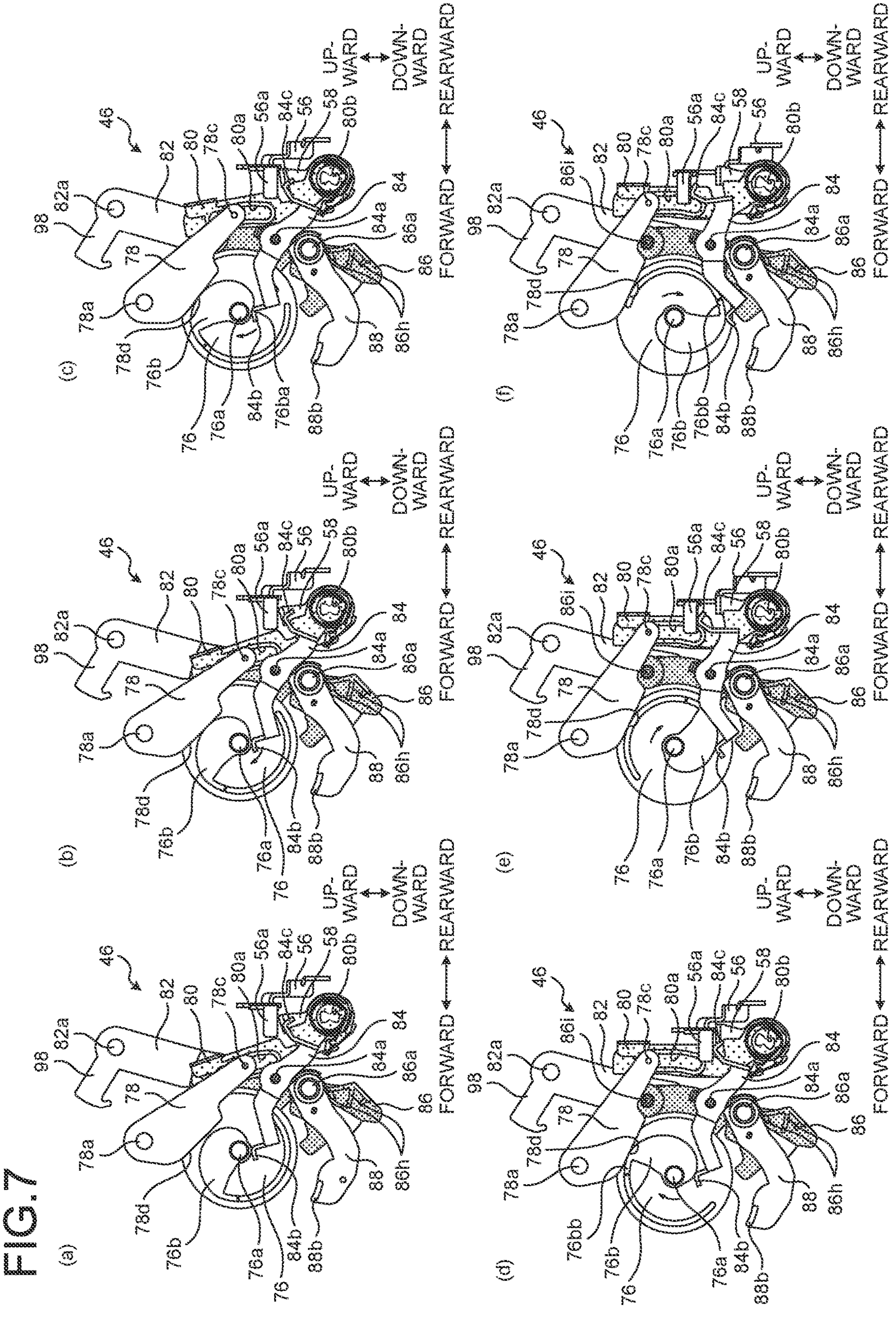
FIG. 7 is a diagram for explaining an operation of the lock mechanism at the time when a cam wheel normally rotates, (a) is a diagram illustrating a basic state in which the cam wheel is at a reference position, (b) is a diagram illustrating a state in which the cam wheel normally and slightly rotates from the reference position, (c) is a diagram illustrating a state in which the cam wheel normally rotates from the reference position by about 40°, (d) is a diagram illustrating a state in which the cam wheel normally rotates from the reference position by about 90°, (e) is a diagram illustrating a state in which the cam wheel normally rotates from the reference position by about 190°, and (f) is a diagram illustrating a state in which the cam wheel normally rotates from the reference position by about 250°.

FIG. 7 is a diagram for explaining an operation of the lock mechanism 46 at the time when the cam wheel 76 normally rotates, (a) is a diagram illustrating a basic state in which the cam wheel 76 is at a reference position, (b) is a diagram illustrating a state in which the cam wheel 76 normally and slightly rotates from the reference position, (c) is a diagram illustrating a state in which the cam wheel 76 normally rotates from the reference position by about 40°, (d) is a diagram illustrating a state in which the cam wheel 76 normally rotates from the reference position by about 90°, (e) is a diagram illustrating a state in which the cam wheel 76 normally rotates from the reference position by about 190°, and (f) is a diagram illustrating a state in which the cam wheel 76 normally rotates from the reference position by about 250°. FIG. 7 is a diagram of the lock mechanism 46 viewed from the inside, and normal rotation of the cam wheel 76 is the clockwise direction.

The cam wheel 76 normally rotates from the basic state illustrated in FIG. 7(*a*) due to action of the motor 94. As illustrated in FIG. 7(*b*), when the cam wheel 76 slightly rotates, the cam 76*b* abuts on the lower surface 78*d* of the cam lever 78 and starts to drive the cam lever 78 in the counterclockwise direction. As illustrated in FIG. 7(*c*), when the cam wheel 76 rotates by about 40°, a radius expansion starting part 76*ba* of the cam 76*b* abuts on the cam passive part 84*b* of the open lever 84, and starts to drive the open lever 84 in the counterclockwise direction. As illustrated in FIG. 7(*d*), when the cam wheel 76 rotates by about 90°, a maximum diameter circular arc part 76*bb* of the cam 76*b* reaches the lower surface 78*d* of the cam lever 78, the cam lever 78 is maximally displaced in the counterclockwise direction, and the maximum displacement is maintained thereafter until the state illustrated in FIG. 7(*f*) is caused. When the cam lever 78 is maximally displaced, the open link 80 is pushed out by the knob 78*c*, and swings to be at the unlatched position. However, at this point, the sub-lock lever 82, the lock lever 86, and the auxiliary lever 88 do not operate and maintain attitudes in FIG. 7(*a*).

When the open lever 84 rotates in the counterclockwise direction, the ratchet operation part 84*c* abuts on and pushes up the passive part 56*a* of the ratchet lever 56. When the passive part 56*a* is pushed up, the ratchet lever 56 starts to rotate about an axis.

As illustrated in FIG. 7(*e*), when the cam wheel 76 rotates by about 190°, the open lever 84 is driven in the counterclockwise direction, and the ratchet operation part 84*c* pushes up the passive part 56*a* of the ratchet lever 56. Substantially at this point, the open lever 84 starts to act on the ratchet holder 54 (refer to FIG. 4), and an unlatch operation is started.

As illustrated in FIG. 7(*f*), when the cam wheel 76 rotates by about 250°, the maximum diameter circular arc part 76*bb* of the cam 76*b* reaches the cam passive part 84*b*, the open lever 84 is maximally displaced in the counterclockwise direction, the passive part 56*a* of the ratchet lever 56 is sufficiently pushed up, the latch mechanism 44 unlatches the striker, and the door is opened. Thereafter, by stopping electric supply to the motor 94, the cam wheel 76 rotates in the counterclockwise direction due to action of the spring 76*c* (refer to FIG. 6), and the lock mechanism 46 returns to the basic state illustrated in FIG. 7(*a*).

At the time of such electric release, as illustrated in FIGS. 7(*a*) to 7(*f*), the open lever 84 rotates under the action of the motor 94 to work on the latch mechanism 44, and the striker can be unlatched accordingly. At this point, the open link 80 reciprocates between the locked position and the unlocked position. The open link 80 does not act on the other components, but operates at appropriate time intervals in synchronization with the time of auto-release, so that it is possible to prevent grease from being hardened due to long-term deterioration, or prevent a spring, a lever, and the like made of steel material from rusting. Due to this, the lock mechanism 46 is enabled to smoothly operate in a predetermined situation.

Only the open link 80 operates in synchronization with auto-release, and the lock lever 86 does not operate. Thus, the spring reception part 86*g* of the lock lever 86 does not get over a bending part 100*g*, and sound is not generated, so that a sense of incongruity is not given to a user.

FIG. 8 is a diagram for explaining the operation of the lock mechanism 46 at the time when the cam wheel 76 reversely rotates and normally rotates, (a) is a diagram illustrating a basic state in which the cam wheel 76 is at the reference position, (b) is a diagram illustrating a state in which the cam wheel 76 reversely rotates from the reference position by about 40°, (c) is a diagram illustrating a state in which the cam wheel 76 normally rotates from the state of (b) by about 40°, and (d) is a diagram illustrating a state in which the cam wheel 76 normally rotates from the state of (c) by about 40°. FIG. 8 is a diagram of the lock mechanism 46 viewed from the outside, and reverse rotation of the cam wheel 76 is the clockwise direction.

The cam wheel 76 reversely rotates from the basic state illustrated in FIG. 8(*a*) due to action of the motor 94. As illustrated in FIG. 8(*b*), when the cam wheel 76 reversely rotates by about 40°, the second inclined wall 76*d* of the cam wheel 76 presses the second projection 86*f*. Due to this, the lock lever 86 rotates in the counterclockwise direction, and the spring reception part 86*g* gets over the bending part 100*a* of the spring 100 to be displaced to a predetermined inclined position. Following the rotation of the lock lever 86, the sub-lock lever 82 is driven by the outer knob 86*c* to rotate in the clockwise direction, the open link 80 is driven by the inner knob 86*i* to rotate in the counterclockwise direction, and the auxiliary lever 88 is driven by the push-out part 86*h* (refer to FIG. 5) to rotate in the counterclockwise direction. Due to this, the sub-lock lever 82 and the open link 80 are caused to be at unlocked positions, and the circular arc projection 88*b* of the auxiliary lever 88 is displaced to a position close to the sleeve 77*a*.

As illustrated in FIG. 8(*c*), when the cam wheel 76 normally rotates by about 40° from the state of FIG. 8(*b*), the cam wheel 76 returns to the position illustrated in FIG. 8(*a*). However, the spring reception part 86*g* is held by the bending part 100*a*, so that the lock lever 86, the sub-lock lever 82, and the open link 80 maintain the attitudes illustrated in FIG. 8(*b*). Due to this, the lock mechanism 46 is caused to be in the unlocked state.

At this point, the circular arc projection 88*b* starts to engage with an inner diameter side surface of the holding wall 76*e* of the cam wheel 76, and the auxiliary lever 88 maintains the attitude illustrated in FIG. 8(*b*).

As illustrated in FIG. 8(*d*), when the cam wheel 76 further normally rotates by about 40° from the state of FIG. 8(*c*), the first inclined wall 77*c* presses the first projection 86*e*. Due to this, the lock lever 86 rotates in the clockwise direction, and the spring reception part 86*g* gets over the bending part 100*a* of the spring 100 to return to the position illustrated in FIG. 8(*a*). Following the rotation of the lock lever 86, the sub-lock lever 82 is driven by the outer knob 86*c* to rotate in the counterclockwise direction, the open link 80 is driven by the cam lever 78 (refer to FIG. 7) to rotate in the clockwise direction, and both of the sub-lock lever 82 and the open link 80 return to the state illustrated in FIG. 8(*a*).

On the other hand, the circular arc projection 88*b* engages with the inner diameter side surface of the holding wall 76*e* of the cam wheel 76, so that the auxiliary lever 88 maintains the attitude illustrated in (d). When the cam wheel 76 further normally rotates, an end part on a counterclockwise side of the circular arc projection 88*b* abuts on a closed surface on the counterclockwise side of the holding wall 76*e* to restrict rotation. Due to this, the cam wheel 76 can be prevented from excessively rotating. Thereafter, when the cam wheel 76 reversely rotates to the position illustrated in FIG. 8(*a*), engagement between the circular arc projection 88*b* and the holding wall 76*e* is released, so that the auxiliary lever 88 rotates in the clockwise direction by elastic force of the spring 88*c* to return to the position illustrated in FIG. 8(*a*). In this way, the lock mechanism 46 returns to a basic attitude illustrated in FIG. 8(*a*) as a whole. As described above, in the door latch device 10, engagement of the latch mechanism 44 can be released, and the locked state and the unlocked state of the lock mechanism 46 can be switched by the single motor 94.

Returning to FIG. 3, the electric components of the door latch device 10 include a latch position switch 102 that detects a rotation state of the latch 12, a key lever position switch 104 that detects a rotation state of the sub-key lever 92, and a first lock position switch 106 and a second lock position switch 108 that detect a rotation state of the sub-lock lever 82 via the arm 98 in addition to the motor 94 described above.

The motor 94, the key lever position switch 104, the first lock position switch 106, and the second lock position switch 108 are collectively disposed in the electric component region 42, but the latch position switch 102 is connected to two terminals 110*a* and 110*b* extending from the electric component region 42 so as to be disposed in the vicinity of the latch 12. The terminals 110*a* and 110*b* are held by a plate 112.

Figure 9:
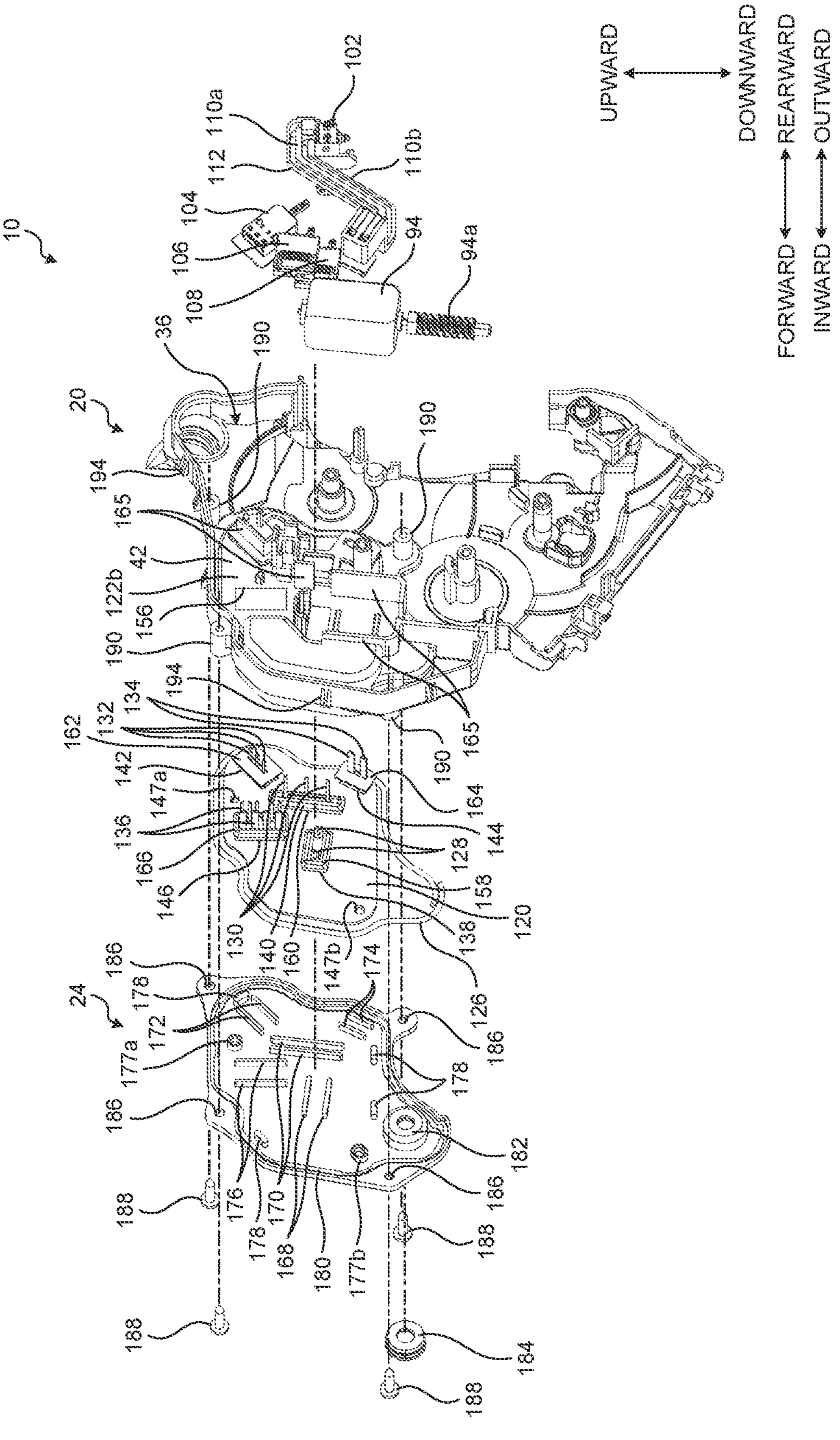
FIG. 9 is an exploded perspective view of electric components, components that house the electric components, and the like viewed from obliquely forward outside.
Figure 10:
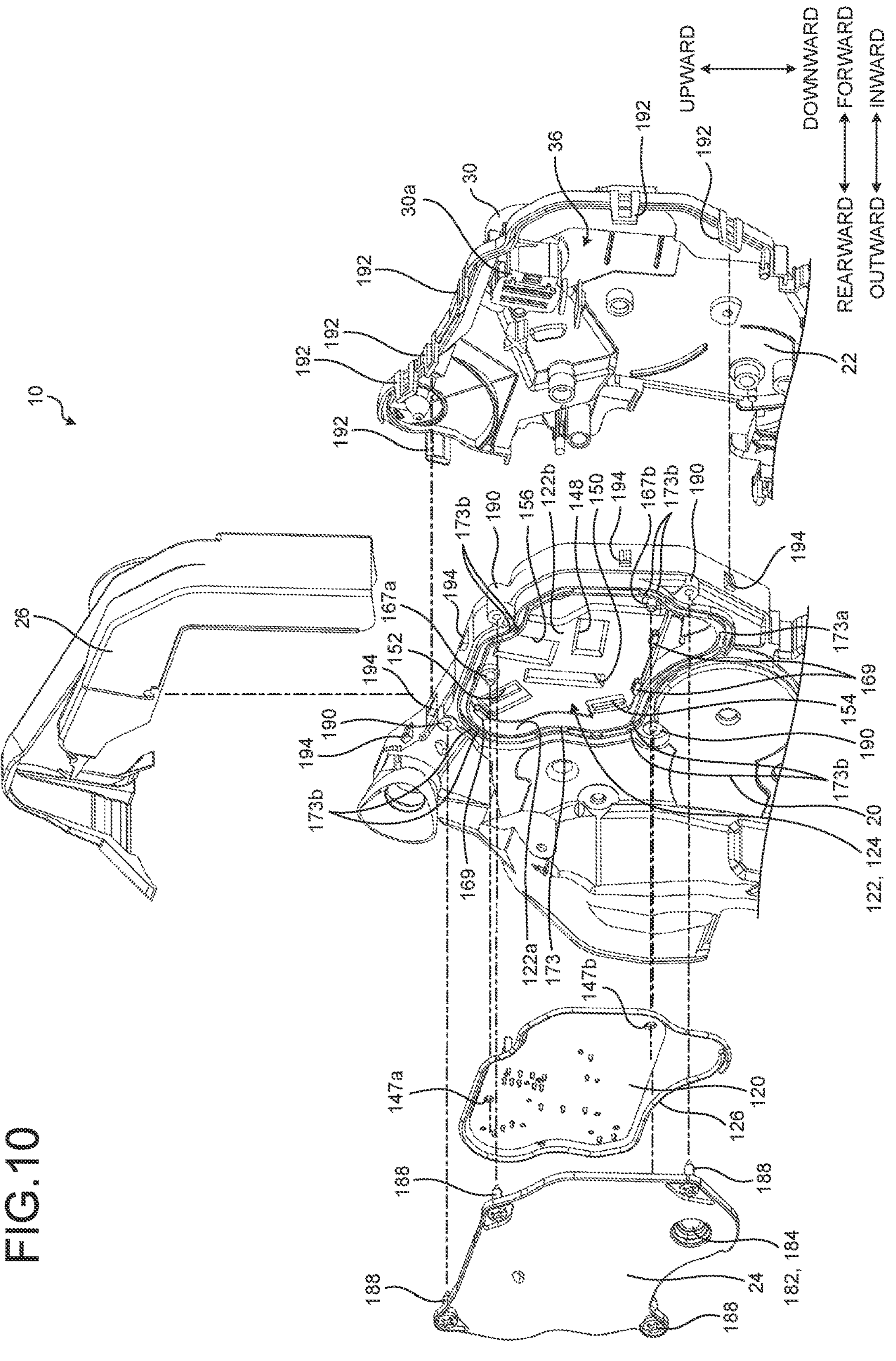
FIG. 10 is an exploded perspective view of electric components, components that house the electric components, and the like viewed from obliquely inside forward.

FIG. 9 is an exploded perspective view of the electric components, components that house the electric components, and the like viewed from obliquely forward outside, and FIG. 10 is an exploded perspective view of the electric components, the components that house the electric components, and the like viewed from obliquely forward inside.

As illustrated in FIG. 9 and FIG. 10, the door latch device 10 includes a circuit board 120 that controls the motor 94. The number of motors controlled by the circuit board 120 may be plural. At an upper part of an outer surface of the case 20, a recessed part 122 is formed in a region corresponding to a back side of the electric component region 42. An outer surface of the recessed part 122 is covered by the second cover 24 described above to form a second housing space 124. The circuit board 120 is housed in the second housing space 124. As described above, the first housing space 36 is partitioned into the mechanism region 40 in which the machine mechanism 38 is disposed, and the electric component region 42 as a remaining region thereof. Thus, the second housing space 124 is disposed on the back side of the electric component region 42 across the case 20. Due to this, the electric components and the like are disposed in a concentrated manner, and a conductive material can be shortened. The electric component region 42 occupies the forward upper part as described above, so that the circuit board 120 disposed on the recessed part 122 of the second housing space 124 is also disposed on the forward upper part based on orientation of the vehicle. The striker entry groove 14 into which waterdrops may penetrate is disposed rearward, so that waterdrops are prevented from reaching the second housing space 124 and the circuit board 120 therein. An external waterproof seal 126 is disposed between an edge of the recessed part 122 and the second cover 24 in the case 20, and the second housing space 124 is waterproofed against the outside. The external waterproof seal 126 is obtained by cutting a string-like sealing material by a predetermined length, and a dedicated molding is not required. The external waterproof seal 126 is disposed such that lower ends thereof are slightly overlapped with each other.

The circuit board 120 includes pins 128, 130, 132, 134, and 136 (hereinafter, also representatively referred to as pins P) erected toward the outside, pin holders 138, 140, 142, 144, and 146 (hereinafter, also representatively referred to as pin holders H) supporting the pins with respect to the circuit board 120 by covering the periphery of bases of the pins P, and two positioning holes 147*a* and 147*b*. The pin holder H has appropriate strength, and can presses an internal waterproof seal B (described later). The pin holder H has appropriate elasticity, and exhibits sealing action for the pin P to be inserted. The pin holder H is made of resin, for example, a molding made of polyacetal.

The two pins 128 are connected to the motor 94. The three pins 130 are connected to the first lock position switch 106 and the second lock position switch 108. The three pins 132 are connected to the key lever position switch 104. The two pins 134 are connected to the latch position switch 102 via the terminals 110*a* and 110*b*. The several pins 136 project inward from a hole of a terminal wall 30*a* of the first cover 22 to be part of the coupler 30. In other words, the coupler 30 includes the terminal wall 30*a* disposed on the first cover 22, and the pins 136 that are erected from the circuit board 120, pass through a pin hole 156 (described later), and project from the hole of the terminal wall 30*a*. The pin P is soldered on a back surface of the circuit board 120.

The pin holder 138 holds the two pins 128, the pin holder 140 holds the three pins 130 in series, the pin holder 142 holds the three pins 132 in series, the pin holder 144 holds the two pins 134, and the pin holder 146 holds the several pins 136 in two columns.

The positioning hole 147*a* and the positioning hole 147*b* are disposed at positions distant from each other. The positioning hole 147*a* is a round hole, the positioning hole 147*b* is a long hole directed to the positioning hole 147*a*, and a manufacturing error of positioning pins 167*a* and 167*b* (described later) is allowed. The circuit board 120 further includes a CPU, a memory, resistance, a capacitor, and the like (not illustrated). The circuit board 120 has an irregular shape substantially along the second housing space 124.

Pin holes 148, 150, 152, 154, and 156 (hereinafter, also representatively referred to as pin holes A) are formed on a bottom plate 122*b* of the recessed part 122 in the case 20. The pin hole A establishes communication between the first housing space 36 and the second housing space 124. The pins 128, 130, 132, 134, and 136 respectively project from the pin holes 148, 150, 152, 154, and 156 in order toward the first housing space 36, and are inserted into pin connection holes disposed on the respective electric components to be electrically connected. Each of the electric components is held by a holding wall 165 disposed on the outer surface of the case 20. Between outer peripheries of the pin holders 138, 140, 142, 144, and 146 and the pin holes 148, 150, 152, 154, and 156, rectangular internal waterproof seals 158, 160, 162, 164, and 166 having a ring shape (hereinafter, also representatively referred to as internal waterproof seals B) are disposed in order. The internal waterproof seal B waterproofs a space between the first housing space 36 and the second housing space 124. The second housing space 124 is waterproofed by the external waterproof seal 126 and the internal waterproof seal B, and suitable for housing the circuit board 120. The internal waterproof seal B preferably has a rectangular ring shape corresponding to the corresponding pin hole A, but parts of a non-ring-shaped body may be overlapped to be used like the external waterproof seal 126 depending on a condition. The circuit board 120 is disposed on an upper part than the striker entry groove 14 (refer to FIG. 3). Specifically, a lower part of the circuit board 120 has a horizontal linear shape, and this portion is disposed on an upper part than an upper end of the striker entry groove 14. Even if the external waterproof seal 126 and the internal waterproof seal B are not disposed, waterdrops entered through the striker entry groove 14 are prevented from reaching the circuit board 120.

Two positioning pins 167*a* and 167*b*, and a plurality of inner circuit board supporters (first circuit board supporters) 169 are further formed on the bottom plate 122*b*. The positioning pins 167*a* and 167*b* are inserted into the positioning holes 147*a* and 147*b*, and the circuit board 120 is positioned. The inner circuit board supporter 169 is disposed at a position along the periphery of the circuit board 120, and abuts on an inner surface of the circuit board 120.

A seal groove 173 is formed along an outer circumference of a surrounding wall 122*a* surrounding the recessed part 122. The external waterproof seal 126 is disposed on the seal groove 173. An overlap groove 173*a* for causing lower ends of the external waterproof seal 126 to be overlapped and disposed is formed in the seal groove 173. Projection pairs 173*b* projecting from both sides in an opposed manner are formed at a plurality of points including a bending point in the seal groove 173. The projection pair 173*b* is a stopper for the external waterproof seal 126. A space between the recessed part 122 and the second cover 24 are entirely waterproofed by the external waterproof seal 126.

Pairs of support projections 168, 170, 172, 174, and 176 (hereinafter, also representatively referred to as support projections C) are formed on an inner surface of the second cover 24. The support projections 168, 170, 172, 174, and 176 are disposed at positions opposed to the pin holders 138, 140, 142, 144, and 146 in order across the circuit board 120. The support projection C supports a back side of an abutting part of the pin holder H in the circuit board 120. The support projection C and a leg part Hd (described later) are disposed on both sides across the pin P in a longitudinal direction of the pin holder H.

On the inner surface of the second cover 24, two positioning posts 177*a* and 177*b*, a plurality of outer circuit board supporters (second circuit board supporters) 178, a seal pressing projection 180, and an osmosis membrane holder 182 are further formed. A round hole is formed on the positioning post 177*a*, and a long hole directed to the positioning post 177*a* is formed on the positioning post 177*b*. The positioning pins 167*a* and 167*b* passed through the positioning holes 147*a* and 147*b* are inserted into respective holes of the positioning posts 177*a* and 177*b*, and the second cover 24 is positioned.

The outer circuit board supporter 178 is disposed at a position along the periphery of the circuit board 120 and a position opposed to the inner circuit board supporter 169 via the circuit board 120, and sandwiches and holds the circuit board 120 between itself and the inner circuit board supporter 169. The inner circuit board supporter 169 and the outer circuit board supporter 178 are disposed to be opposed to each other, and to have the same cross-sectional shape and the same orientation.

The seal pressing projection 180 is a narrow projection having a substantially ring shape along the seal groove 173, and presses an outer surface of the external waterproof seal 126. The external waterproof seal 126 exhibits sealing action by being pressed to be sealed by the seal pressing projection 180.

The osmosis membrane holder 182 is a cylindrical body projecting outward, and has a hole 182*a* at a distal end thereof. An osmosis membrane filter 184 is attached to the osmosis membrane holder 182 from inside. The osmosis membrane filter 184 can prevent passage of waterdrops and cause water vapor to pass through the hole 182*a*, and prevents the second housing space 124 from being caused to be in a high humidity state. The osmosis membrane holder 182 and the osmosis membrane filter 184 are disposed in a space under the circuit board 120 in the second housing space 124. The osmosis membrane holder 182 is disposed in a range surrounded by an abutting part of the external waterproof seal 126 on the second cover 24.

A plurality of screw holes 186 are disposed on the periphery of the second cover 24, and when a screw 188 passed through the screw hole 186 is screwed to a screw post 190 disposed on the case 20, the second cover 24 is fixed to the case 20.

A plurality of hooks 192 are disposed on the periphery of the first cover 22, and when the hook 192 engages with a pawl 194 disposed on the case 20, the first cover 22 is fixed to the case 20. After the first cover 22 and the second cover 24 are attached to the case 20, the waterproof cover 26 is attached thereto from above. With the waterproof cover 26, even if the external waterproof seal 126 and the internal waterproof seal B are not disposed, waterdrops from above can be fairly prevented from reaching the circuit board 120 within the second housing space 124 covered by the second cover 24.

The first housing space 36 formed between the case 20 and the first cover 22 is not completely waterproofed, and has what is called a dripproof structure. This is because that the dripproof structure is sufficient for each component housed in the first housing space 36. On the other hand, as described above, the second housing space 124 has a waterproof structure due to the external waterproof seal 126 and the internal waterproof seal B because precision electronic component and the like are mounted on the circuit board 120.

Nest, the following further describes the waterproof structure of the second housing space 124.

Figure 11:
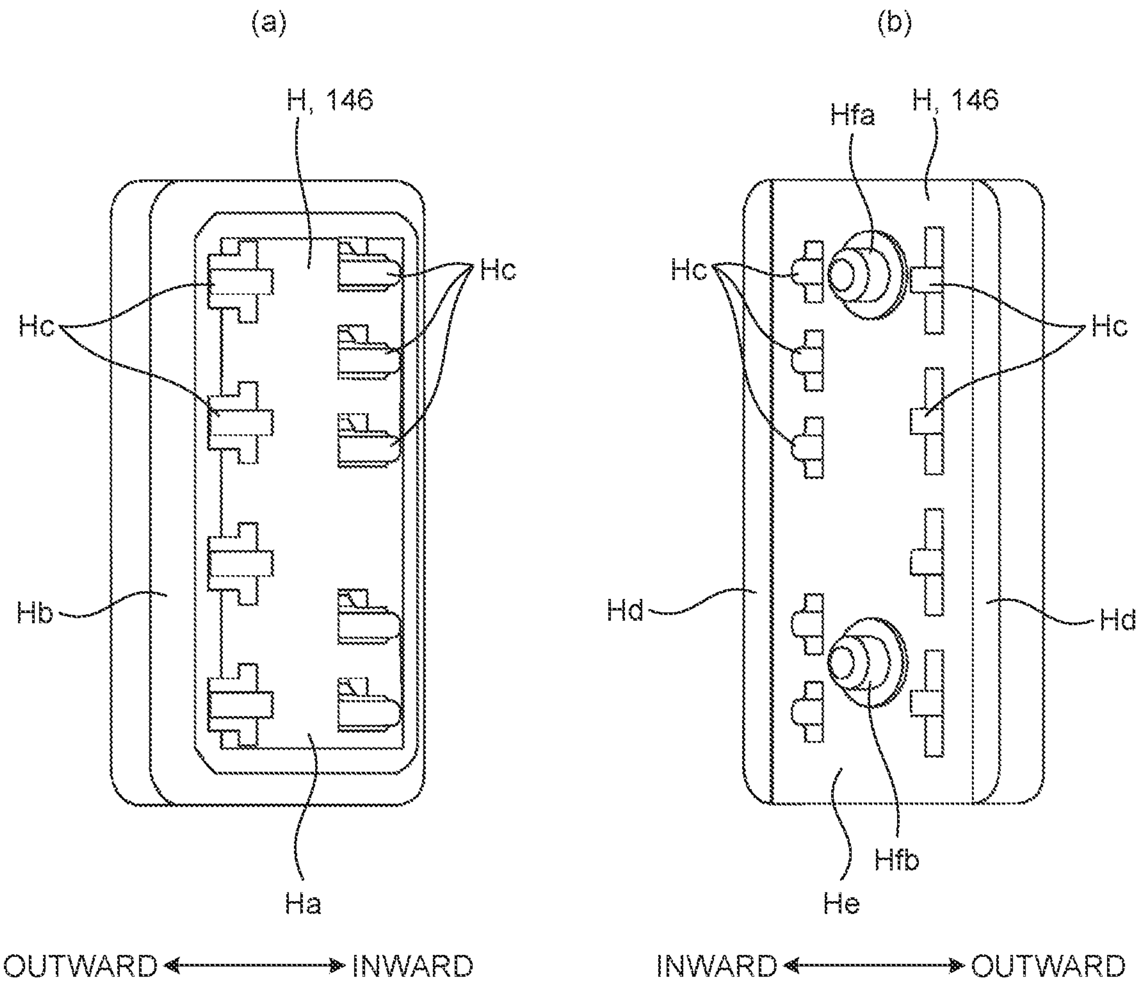
FIG. 11 is a diagram illustrating a pin holder, (a) is a perspective view thereof viewed from obliquely inward, and (b) is a perspective view thereof viewed from obliquely outward.

FIG. 11 is a diagram illustrating a pin holder H, (a) is a perspective view thereof viewed from obliquely inward, and (b) is a perspective view thereof viewed from obliquely outward. FIG. 11 exemplifies the pin holder 146.

As illustrated in FIG. 11(*a*), the pin holder H has a rectangular shape having four round corners. An inner surface Ha of the pin holder H is a plane, and an inclined surface Hb is formed around the inner surface Ha. The inner surface Ha and the inclined surface Hb are smooth. Holes Hc into which corresponding pins P (refer to FIG. 12) are respectively inserted are formed on the pin holder H. The holes Hc are formed corresponding to the number and shapes of pins P, and exhibit sealing action with respect to the pins P.

As illustrated in FIG. 11(*b*), on an outer surface of the pin holder H, a pair of leg parts Hd is formed in the longitudinal direction on both sides in the lateral direction. A space between the pair of leg parts Hd is a recessed part He that is slightly recessed. The hole Hc opens at the recessed part He. On the recessed part He, two positioning projections, that is, a positioning projection Hfa and a positioning projection Hfb that are slightly distant from each other in the longitudinal direction are disposed.

Figure 12:
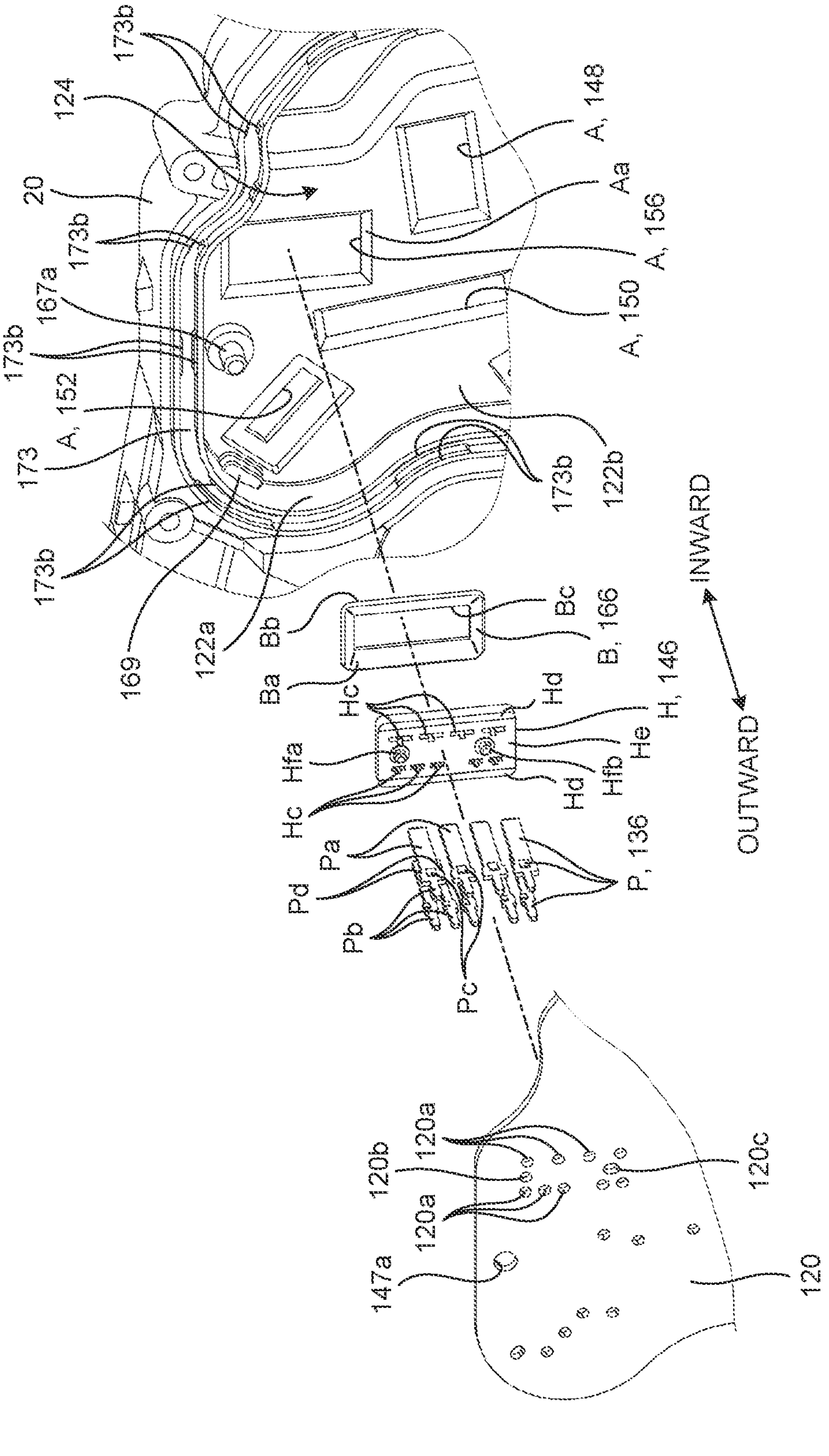
FIG. 12 is an exploded perspective view of a circuit board, a pin holder, a pin, an internal waterproof seal, and a case.

FIG. 12 is an exploded perspective view of the circuit board 120, the pin holder H, the pin P, the internal waterproof seal B, and the case 20. FIG. 12 exemplifies the pin holder 146 and portions related thereto.

As illustrated in FIG. 12, each of the pins P includes a main part Pa that projects from the pin hole A and is electrically connected to an electric component, a solder leg Pb that passes through a component hole 120*a* of the circuit board 120 to be soldered, a wedge part Pc as a portion that is inserted into the hole Hc of the pin holder H to be engaged with the hole Hc, and a stopper Pd that restricts an insertion depth with respect to the hole Hc. A pair of the stoppers Pd is disposed for each pin P. The pin P may be directly connected to a connection port of the electric component (refer to the motor 94 in FIG. 13 and the key lever position switch 104 in FIG. 15), or may be indirectly connected thereto via an electric conductor (refer to the latch position switch 102 in FIG. 9).

The circuit board 120 includes the component hole 120*a* described above, a positioning hole 120*b* into which the positioning projection Hfa is inserted, and a positioning hole 120*c* into which the positioning projection Hfb is inserted. The positioning hole 120*b* is a round hole. The positioning hole 120*c* is a long hole directed to the positioning hole 120*b*, and can allow a manufacturing error of the positioning projection Hfa and the positioning projection Hfb.

The internal waterproof seal B is a component to cover the inclined surface Hb (refer to FIG. 11(*a*)) of the pin holder H, and has a rectangular pyramid shape corresponding to inclination of the inclined surface Hb. The internal waterproof seal B has an outer surface Ba that abuts on the inclined surface Hb, an inner surface Bb that abuts on the pin hole A, and a rectangular hole Bc.

The pin hole A is a rectangular hole through which the pin P projects, and includes an inclined surface Aa that becomes narrower toward the inside. The inclined surface Aa is formed to be smooth. An opening of the pin hole A is set to be larger than the rectangular hole Bc of the internal waterproof seal B. The inclined surface Aa, the outer surface Ba and the inner surface Bb of the internal waterproof seal B, and the inclined surface Hb of the pin holder H have the same inclination.

At the time of attaching the pins P to the circuit board 120, first, each of the pins P is inserted into the hole Hc of the corresponding pin holder H from the outer surface. The pin P is inserted into an appropriate depth with the stopper Pd, and locked by the wedge part Pc.

Next, the pin holder H into which the pin P is inserted is temporarily disposed at a predetermined point on the circuit board 120. The pin holder H is correctly positioned when the positioning projections Hfa and Hfb are respectively inserted into the positioning holes 120*b* and 120*c*. By using the pin holder H, each solder leg Pb of the pins P is correctly and easily inserted into the component hole 120*a*. It is more efficient that the pins P are inserted into the pin holder H as preparation at a different step as compared with a case of directly soldering the pin P to the circuit board 120 one by one.

After all of a plurality of the pin holders H are temporarily disposed at predetermined points, a portion of the solder leg Pb projecting toward the outer surface side of the circuit board 120 is soldered. Due to this, each pin P is fixed to the circuit board 120 together with the pin holder H.

The circuit board 120 is housed in the second housing space 124 after the pin P, the pin holder H, the electronic components, and the like are implemented thereon. At this point, the internal waterproof seal B is disposed between the pin holder H and the pin hole A. Additionally, as illustrated in FIG. 10, after the external waterproof seal 126 is disposed in the seal groove 173, the second cover 24 is attached to the case 20 with the screw 188.

Figure 13:
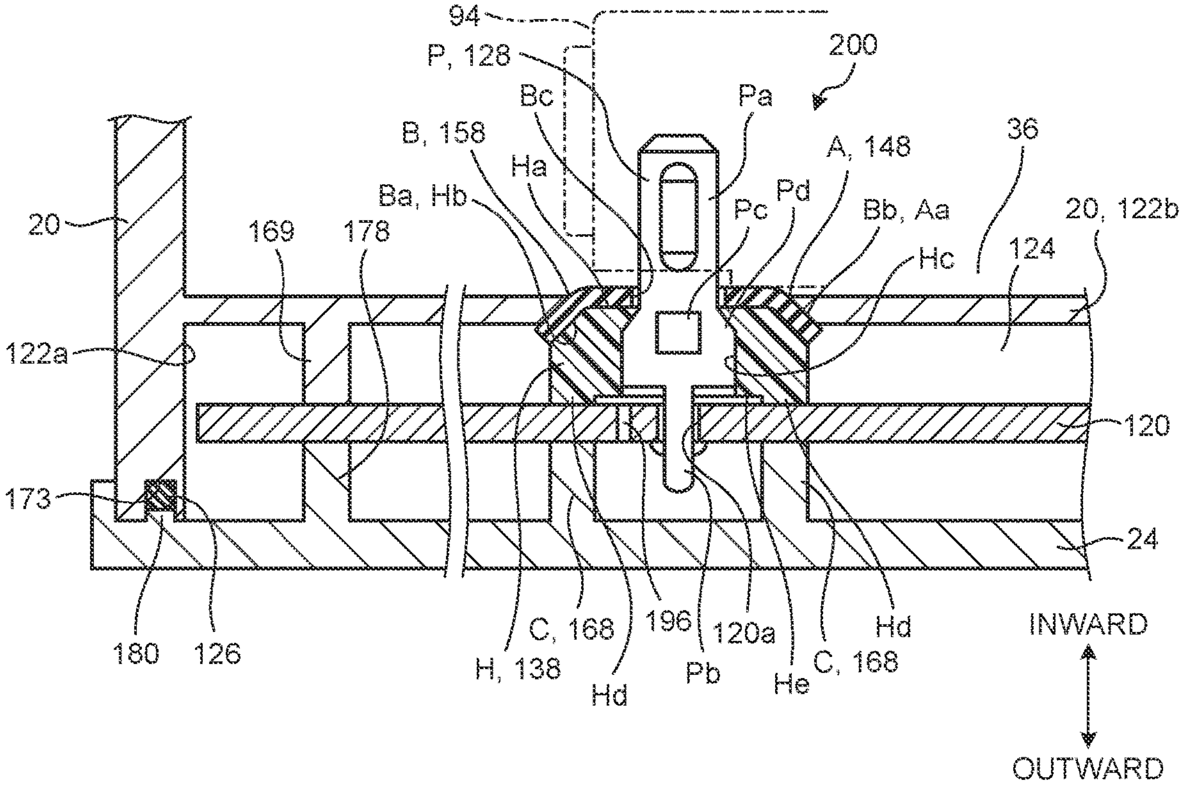
FIG. 13 is a partial cross-sectional side view of the pin holder and the periphery thereof viewed from a longitudinal direction of the pin holder.
Figure 14:
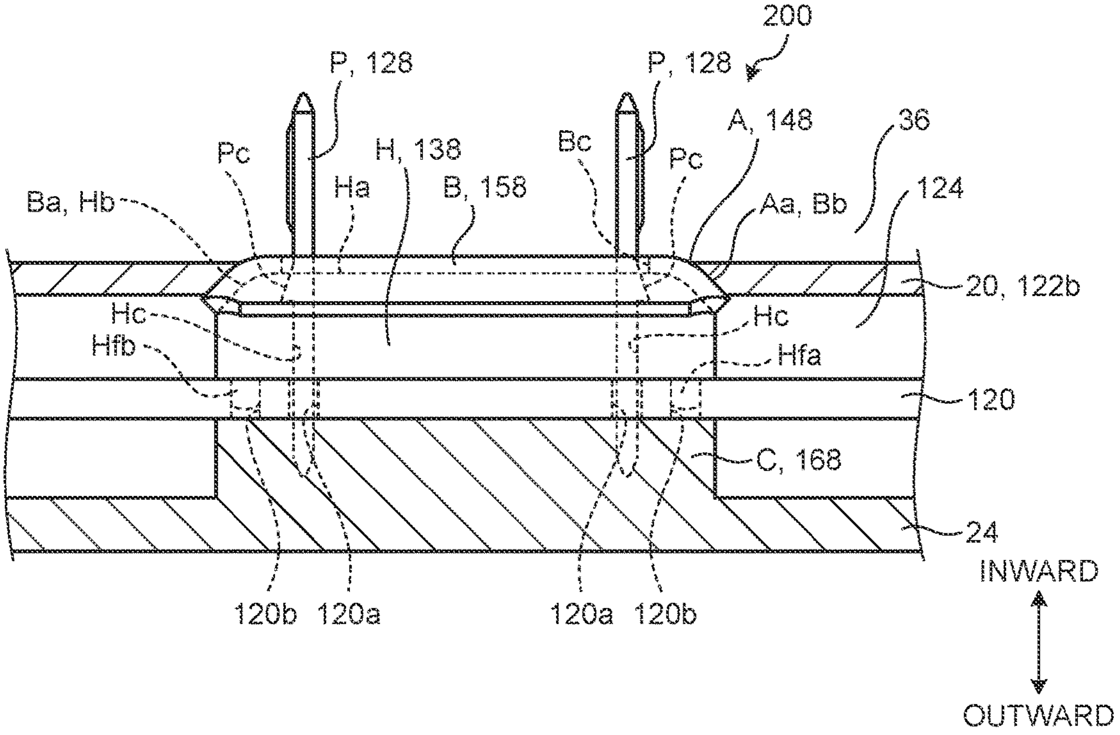
FIG. 14 is a partial cross-sectional side view of the pin holder and the periphery thereof viewed from a lateral direction of the pin holder.

FIG. 13 is a partial cross-sectional side view of the pin holder H and the periphery thereof viewed from the longitudinal direction of the pin holder H, and FIG. 14 is a partial cross-sectional side view of the pin holder H and the periphery thereof viewed from the lateral direction of the pin holder H. FIG. 13 and FIG. 14 exemplify the pin holder 138 and portions related thereto.

As illustrated in FIG. 13, when the second cover 24 is attached to the case 20 after the circuit board 120 is housed in the second housing space 124, the external waterproof seal 126 is compressed and deformed by being appropriately pressed by the seal groove 173 and the seal pressing projection 180 to exhibit sealing action, and waterproofs the second housing space 124 against the outside. The circuit board 120 is sandwiched by the inner circuit board supporter 169 and the outer circuit board supporter 178 to be stabilized.

As illustrated in FIG. 13 and FIG. 14, when the second cover 24 is attached to the case 20, the second cover 24 presses the pin holder H and the internal waterproof seal B inward via the support projection C and the circuit board 120. The internal waterproof seal B is sandwiched by the inclined surface Aa of the pin hole A and the inclined surface Hb of the pin holder H at an appropriately wide area, and is compressed and deformed by being appropriately pressed to exhibit sealing action. In the internal waterproof seal B, the inner surface Bb exhibits sealing action with respect to the inclined surface Aa, and the outer surface Ba exhibits sealing action with respect to the inclined surface Hb.

The pin P, the pin holder H, the pin hole A, and the internal waterproof seal B form an internal waterproof structure 200. The internal waterproof structure 200 waterproofs a space between the second housing space 124 and the first housing space 36. That is, the sealing action between the inner surface Bb and the inclined surface Aa prevents water from entering the second housing space 124 through the rectangular hole Bc. Due to the sealing action between the hole Hc of the pin holder H and the pin P, water is prevented from running through the surface of the pin P to enter the surface of the circuit board 120. In this way, in the door latch device 10, the entire second housing space 124 is waterproofed, and the entire surface of the circuit board 120 is waterproofed.

The internal waterproof structure 200 also has a function of stably holding the circuit board 120. Specifically, a plurality of the internal waterproof structures 200 are disposed to be appropriately distributed, so that the circuit board 120 is stabilized.

The internal waterproof seal B projects slightly inward as compared with the pin hole A, and an end face thereof can abut on the electric component. Specifically, the motor 94 has relatively heavy weight among the electric components, but can reduce force applied to the pin P by abutting on the end face of the internal waterproof seal B. The internal waterproof seal B has elasticity, and is appropriate for supporting the electric component.

The pin holder H has some kinds of action. That is, the pin holder H has action of holding the pins P to be collectively inserted into component holes 120*a* of the circuit board 120, action of holding the pin P inserted into the component hole 120*a* in an erected state, action of receiving force from the support projection C by the leg part Hd and transmitting the force to the internal waterproof seal B to compress the internal waterproof seal B to achieve waterproofing with respect to the pin hole A, action of waterproofing a space between the inclined surface Hb and the outer surface Ba, and action of supporting the pin P and the electric component in an auxiliary manner at the time when the electric component is connected to the main part Pa of the pin P. Gravity and vibration applied to the pin P from the electric component is received, absorbed, and distributed by the pin holder H, and external force applied to the soldered portion can be suppressed. Thus, it is sufficient that the pin P is electrically connected to the electric component, and mechanical strength for supporting the electric component may be small. Due to this, for example, a base part of the pin P is not required to have a complicated shape like the pin disclosed in Patent Literature 2, and may have a simple narrow shape, so that cost can be reduced and an area of the circuit board 120 can be effectively used.

The pair of support projections C is opposed to the pair of leg parts Hd across the circuit board 120, so that the pin holder H can be securely pressed inward. Specifically, the pair of support projections C and the pair of leg parts Hd are disposed to have the same cross-sectional shape and the same orientation, so that the pair of support projections C and the pair of leg parts Hd are disposed to be overlapped with each other in a plan view. Accordingly, wasteful force is not applied to the other portion of the circuit board 120, and bending deformation of the circuit board 120 and the like can be prevented, for example. The same applies to a relation between the inner circuit board supporter 169 and the outer circuit board supporter 178 described above. A plan view of the support projection C and the leg part Hd is omitted, but it can be obviously found that the support projection C and the leg part Hd overlap with each other in a plan view from FIG. 13 and FIG. 14.

The support projection C and the leg part Hd are formed in the longitudinal direction of the pin holder H, so that pressing force is distributed as an appropriately wide area is secured, and the support projection C and the leg part Hd are stabilized because of their appropriate length. The support projection C and the leg part Hd are balanced because they are disposed on both sides across the pin P. However, the support projection C and the leg part Hd may be disposed on only one side with respect to the pin P if a condition such that a certain area is secured is satisfied. The outer side of the circuit board 120 is supported by the outer circuit board supporter 178, so that the support projection C may be omitted depending on a condition.

The recessed part He is formed between the pair of leg parts Hd, so that a gap is secured between the recessed part He and the surface of the circuit board 120. A through hole 196, a pattern (not illustrated), and a land can be disposed in a gap facing the recessed part He in the circuit board 120, and a dead area of the surface of the circuit board 120 is reduced.

Figure 15:
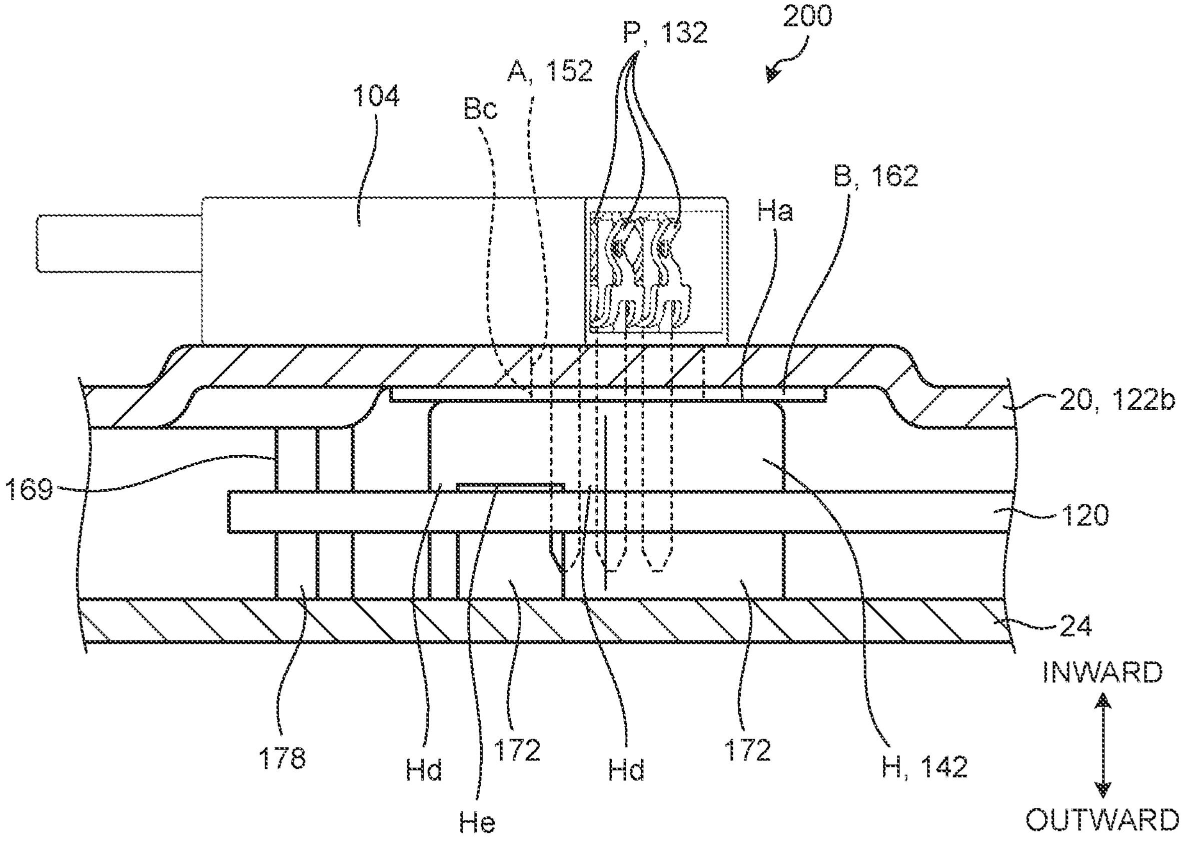
FIG. 15 is a partial cross-sectional side view of the pin holder and the periphery thereof different from FIG. 13 and FIG. 14.

FIG. 15 is a partial cross-sectional side view of the pin holder H and the periphery thereof different from FIG. 13 and FIG. 14. FIG. 15 exemplifies the pin holder 142 and portions related thereto.

The pin holder 138 illustrated in FIG. 13 and FIG. 14 includes the inclined surface Hb, and the corresponding pin hole A and internal waterproof seal B have the inclined surfaces. On the other hand, the pin holder 142 illustrated in FIG. 15 has a substantially box shape without the inclined surface Hb, the corresponding internal waterproof seal 162 has a flat plate shape without an inclined surface, and the corresponding pin hole 152 is a rectangular hole without the inclined surface Aa.

In this case, the internal waterproof seal 162 is pressed by the inner surface Ha of the pin holder 142 and a peripheral part of the pin hole 152 on the bottom plate 122*b* to exhibit sealing action. The pin holder 142 and the internal waterproof seal 162 in this case have a simple shape, and can be easily manufactured.

The internal waterproof seal B and the pin holder H may be integrated with each other by a joining unit such as bonding or welding. Due to this, positioning of the internal waterproof seal B becomes unnecessary, and assembly is facilitated. When the internal waterproof seal B and the pin holder H are bonded to each other, a space therebetween is completely waterproofed. Additionally, the internal waterproof seal B and the pin holder H may be an integrated molding made of the same material. Due to this, the number of components can be reduced.

The present invention is not limited to the embodiment described above, and can be freely modified without departing from the gist of the present invention, obviously.

REFERENCE SIGNS LIST

10 Door latch device
12 Latch
14 Striker entry groove
16 Cover plate
18 Body
20 Case
22 First cover
24 Second cover
30 Coupler
32 Key cylinder coupling part
34 Outer lever
34*a* Handle operating part
34*c* Lever passive piece
34*b* Action part
36 First housing space
38 Machine mechanism
40 Mechanism region
42 Electric component region
44 Latch mechanism
46 Lock mechanism
52 Ratchet
54 Ratchet holder
58 Anti-panic lever
59 Inner lever
66 Pole lever
76 Cam wheel
76*b* Cam
77 Auxiliary component
78 Cam lever

80 Open link (position switching member)
82 Sub-lock lever
84 Open lever
84*c* Ratchet operating part
86 Lock lever
88 Auxiliary lever
90 Key lever
92 Sub-key lever
94 Motor
120 Circuit board
120*a* Component hole
120*b*, 120*c*, 147*a*, 147*b* Positioning hole
122 Recessed part
124 Second housing space
126 External waterproof seal
128, 130, 132, 134, 136, P Pin
138, 140, 142, 144, 146, H Pin holder
148, 150, 152, 154, 156, A Pin hole
158, 160, 162, 164, 166, B Internal waterproof seal
168, 170, 172, 174, 176, C Support projection
169 Inner circuit board supporter
173 Seal groove
178 Outer circuit board supporter
182 Osmosis membrane holder
184 Osmosis membrane filter

The invention claimed is:

1. A door latch device for being disposed on a door of a vehicle, the door latch device being configured to latch and unlatch a striker disposed on a main body side of the vehicle to close and open the door, and the door latch device comprising:
- an electric component including a motor;
- a machine mechanism configured to be driven by the motor;
- a circuit board electrically connected to the electric component;
- a case;
- a first cover forming a first housing space in which the motor and the machine mechanism are housed by covering one surface of the case;
- a second cover forming a second housing space in which the circuit board is housed by covering another surface of the case;
- a pin hole disposed in the case to establish communication between the first housing space and the second housing space;
- a pin erected from the circuit board to project to the first housing space through the pin hole;
- a pin holder configured to support the pin with respect to the circuit board by covering a periphery of a base of the pin;
- an external waterproof seal disposed between the case and the second cover, and configured to waterproof the second housing space against outside; and
- an internal waterproof seal disposed between the pin holder and the pin hole, and configured to waterproof a space between the first housing space and the second housing space, wherein
- the second cover includes a support projection configured to support a back side of an abutting part of the pin holder on the circuit board,
- the pin holder includes a leg part at a position opposed to the support projection across the circuit board, and
- a pair of the leg parts is disposed on both sides across an inserting part of the pin in a longitudinal direction of the pin holder.

2. The door latch device according to claim 1, wherein a plurality of internal waterproof structures each including the pin, the pin holder, the pin hole, and the internal waterproof seal are disposed.

3. The door latch device according to claim 1, wherein the support projection and the leg part are disposed to be overlapped with each other on the circuit board in a plan view.

4. The door latch device according to claim 1, wherein the pin holder includes a positioning projection inserted into a positioning hole disposed on the circuit board to perform positioning.

5. The door latch device according to claim 1, wherein a part of the internal waterproof seal projects to the first housing space from the pin hole to abut on the electric component.

6. The door latch device according to claim 1, wherein
- the case comprises:
  - a recessed part forming part of the second housing space;
  - a surrounding wall configured to surround the recessed part; and
  - a seal groove formed along an outer circumference of the surrounding wall,
- the second housing space is formed by covering the recessed part by the second cover, and
- the external waterproof seal is disposed in the seal groove.

7. The door latch device according to claim 1, wherein the circuit board is sandwiched by a first circuit board supporter disposed in the case and a second circuit board supporter disposed on the second cover.

8. A door latch device for being disposed on a door of a vehicle, the door latch device being configured to latch and unlatch a striker disposed on a main body side of the vehicle to close and open the door, and the door latch device comprising:
- an electric component including a motor;
- a machine mechanism configured to be driven by the motor;
- a circuit board electrically connected to the electric component;
- a case;
- a first cover forming a first housing space in which the motor and the machine mechanism are housed by covering one surface of the case;
- a second cover forming a second housing space in which the circuit board is housed by covering another surface of the case;
- a pin hole disposed in the case to establish communication between the first housing space and the second housing space;
- a pin erected from the circuit board to project to the first housing space through the pin hole;
- a pin holder configured to support the pin with respect to the circuit board by covering a periphery of a base of the pin;
- an external waterproof seal disposed between the case and the second cover, and configured to waterproof the second housing space against outside; and
- an internal waterproof seal disposed between the pin holder and the pin hole, and configured to waterproof a space between the first housing space and the second housing space, wherein
- the machine mechanism comprises:
  - a latch mechanism configured to hold the door in a closed state;

an electric release unit configured to release the latch mechanism by power of the motor;

a manual release unit configured to release the latch mechanism by manual operation force; and a lock mechanism configured to switch between a locked state for disabling a function of the manual release unit and an unlocked state for enabling the function of the manual release unit, the electric release unit includes a cam wheel configured to normally rotate and reversely rotate from a reference position by power of the motor, the lock mechanism is held in the locked state at the time when the cam wheel is at the reference position, the latch mechanism is released when the cam wheel normally rotates against spring force from the reference position, the lock mechanism is caused to be in the unlocked state, and the lock mechanism is switched to the locked state when the cam wheel returns to the reference position by spring force, and the lock mechanism is returned to the locked state when the cam wheel reversely rotates from the reference position and normally rotates to return to the reference position.

9. A door latch device for being disposed on a door of a vehicle, the door latch device being configured to latch and unlatch a striker disposed on a main body side of the vehicle to close and open the door, and the door latch device comprising:

an electric component including a motor;

a machine mechanism configured to be driven by the motor;

a circuit board electrically connected to the electric component;

a case;

a first cover forming a first housing space in which the motor and the machine mechanism are housed by covering one surface of the case;

a second cover forming a second housing space in which the circuit board is housed by covering another surface of the case;

a pin hole disposed in the case to establish communication between the first housing space and the second housing space;

a pin erected from the circuit board to project to the first housing space through the pin hole;

a pin holder configured to support the pin with respect to the circuit board by covering a periphery of a base of the pin;

an external waterproof seal disposed between the case and the second cover, and configured to waterproof the second housing space against outside; and an internal waterproof seal disposed between the pin holder and the pin hole, and configured to waterproof a space between the first housing space and the second housing space, wherein the machine mechanism comprises:

a latch mechanism configured to hold the door in a closed state;

an electric release unit configured to release the latch mechanism by power of the motor;

a manual release unit configured to release the latch mechanism by manual operation force; and a lock mechanism configured to switch between a locked state for disabling a function of the manual release unit and an unlocked state for enabling the function of the manual release unit, the electric release unit includes a cam wheel configured to normally rotate and reversely rotate from a reference position by power of the motor, the lock mechanism is held in the locked state at the time when the cam wheel is at the reference position, the latch mechanism is released when the cam wheel normally rotates against spring force from the reference position, the lock mechanism is caused to be in the unlocked state, and the lock mechanism is switched to the locked state when the cam wheel returns to the reference position by spring force, the lock mechanism is returned to the locked state when the cam wheel reversely rotates from the reference position and normally rotates to return to the reference position, the lock mechanism comprises:

a position switching member configured to be switched between an unlocked position at which a door-opening operation by the manual release unit is able to be transmitted to the latch mechanism and a locked position at which the door-opening operation is unable to be transmitted; and a lock lever configured to interlock with the manual release unit or the electric release unit to be able to switch the position switching member between the unlocked position and the locked position, and when the cam wheel normally rotates against spring force from the reference position, the position switching member is switched to the unlocked position from the locked position, and the lock lever does not operate.

* * * * *